(12) United States Patent
Lee et al.

(10) Patent No.: US 10,380,563 B2
(45) Date of Patent: Aug. 13, 2019

(54) MOBILE TERMINAL AND METHOD FOR CONTROLLING THE SAME

(71) Applicant: LG ELECTRONICS INC., Seoul (KR)

(72) Inventors: Yoonwoo Lee, Seoul (KR); Jeongyun Heo, Seoul (KR); Hyungtae Jang, Seoul (KR); Junghoon Chu, Seoul (KR); Gukchan Lim, Seoul (KR); Hongjo Shim, Seoul (KR); Seonghyok Kim, Seoul (KR); Mihyun Park, Seoul (KR); Dongeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 491 days.

(21) Appl. No.: 14/952,816

(22) Filed: Nov. 25, 2015

(65) Prior Publication Data

US 2016/0350729 A1     Dec. 1, 2016

(30) Foreign Application Priority Data

May 27, 2015   (KR) .................. 10-2015-0074236
Jun. 2, 2015    (KR) .................. 10-2015-0078082

(51) Int. Cl.
*G06Q 20/10*  (2012.01)
*G06Q 30/00*  (2012.01)
*G06Q 30/06*  (2012.01)
*G06Q 20/32*  (2012.01)
*G06Q 30/02*  (2012.01)

(52) U.S. Cl.
CPC ......... *G06Q 20/10* (2013.01); *G06Q 20/3223* (2013.01); *G06Q 30/00* (2013.01); *G06Q 30/0241* (2013.01); *G06Q 30/0601* (2013.01)

(58) Field of Classification Search
CPC ...................................................... G06Q 20/10
USPC ............................................................. 705/40
See application file for complete search history.

(56) References Cited

U.S. PATENT DOCUMENTS

2012/0016731 A1*  1/2012  Smith ............... G06Q 20/20
                                                  705/14.33
2013/0218721 A1*  8/2013  Borhan ............. G06Q 20/322
                                                  705/26.41
2013/0325569 A1* 12/2013  Holmes ............ G06Q 20/123
                                                  705/14.13

(Continued)

OTHER PUBLICATIONS

Web Analytics 2.0, "the art of online Accontability and seience of customer Centricity" Sybex Oct. 2009 122 pages. (Year: 2009).*

(Continued)

*Primary Examiner* — Bruce I Ebersman
(74) *Attorney, Agent, or Firm* — Lee Hong Degerman Kang & Waimey

(57) ABSTRACT

Disclosed are a mobile terminal having a payment function and a control method thereof. The mobile terminal includes a display unit configured to display screen information regarding purchase of and payment for the product, a memory including information regarding a plurality of different payment interfaces, and a control unit configured to, when the payment for the product is requested, allow the payment to be made through any one of the plurality of different payment interfaces based on an action of a user sensed before the payment is requested.

14 Claims, 28 Drawing Sheets

(56) References Cited

U.S. PATENT DOCUMENTS

| | | | | |
|---|---|---|---|---|
| 2013/0346302 A1* | 12/2013 | Purves | ............... | G06Q 20/102 705/40 |
| 2014/0081783 A1 | 3/2014 | Paranjape et al. | | |
| 2014/0108197 A1* | 4/2014 | Smith | ............... | G06Q 30/0233 705/26.9 |
| 2015/0012426 A1* | 1/2015 | Purves | ............... | G06Q 30/0623 705/41 |
| 2015/0085317 A1 | 3/2015 | Kim et al. | | |

OTHER PUBLICATIONS

Wikipedia, "Mobile Device," Internet Article:http://en.wikipedia.org/wiki/Mobile_device, XP055253030, May 2015, 4 pages.

Wikipedia, "Mobile Web," Internet Article:http://en.wikipedia.org/wiki/Mobile_Web, XP055252877, Mar. 2015, 6 pages.

Wikipedia, "Web analytics," Internet Article:http://en.wikipedia.org/wiki/Web_analytics, XP055252870, Mar. 2015, 12 pages.

Wikipedia, "Online shopping," Internet Article:http://en.wikipedia.org/wiki/Online_shopping, XP055252873, May 2015, 12 pages.

Kaushik, "Web Analyrics 2.0: The Art of Online Accountability and Science of Customer Centricity," SYBEX, XP055253026, Oct. 2009, 122 pages.

Friedman, "Amazon.com for Dummies," Wiley Publishing, Inc, XP055252784, Jan. 2004, 386 pages.

Neef, "Das Ultimative Praxisbuch zu Android Smartphones—Zu Android 4 and den Vorgangerversionen," Data Becker, XP055253025, Apr. 2012, 8 pages.

Vermaat, "Discovering Computers 2014," Course Technology, XP055253029, Jul. 2013, 4 pages.

European Patent Office Application Serial No. 16000094.9, Search Report dated Mar. 14, 2016, 12 pages.

European Patent Office Application Serial No. 16000094.9, Office Action dated Feb. 15, 2018, 10 pages.

Wikipedia, "Smartwatch", Retrieved from the web, May 2015, XP055449713, 14 pages.

Techcrunch, "Apple Pay Demo", YouTube video, Sep. 2014, XP055264808, 10 pages.

European Patent Office Application Serial No. 16000094.9, Result of Consultation dated Mar. 13, 2019, 10 pages.

Bove, T., "iPod and iTunes for Dummies," Aug. 2009, XP055558985, 7 pages.

Komatinei, S. et al., "Pro Android 4," Feb. 2012, XP055558993, 3 pages.

* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application Nos. 10-2015-0074236, filed on May 27, 2015, and 10-2015-0078082, filed on Jun. 2, 2015, the contents of which are incorporated by reference herein in their entirety.

BACKGROUND OF THE INVENTION

1. Field of the Invention

The present invention relates to a mobile terminal having a payment function and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

To support and enhance functions of such a terminal, it can be considered to improve a structural part and/or a software part of the terminal As one of such improvements, a payment function of purchasing and paying for a product on-line with a mobile terminal is attracting much attention.

Such a payment function of a mobile terminal allows a user to easily and conveniently purchase and pay for a product. However, actually, the easy and convenient purchase of and payment for a product cause a security problem or excessive consumption problem to have brought to the fore. Thus, research is being actively conducted on a method of solving these problems while enabling a user to conveniently and safely use a payment function of a mobile terminal.

SUMMARY OF THE INVENTION

Therefore, an aspect of the detailed description is to provide a mobile terminal for providing an appropriate payment interface depending on a purchase type of a user corresponding to the requested payment upon payment request, and a method for controlling the same.

Another aspect of the detailed description is to provide a mobile terminal for preventing a user from making an impulse purchase and for providing a safe payment function, and a method for controlling the same.

To achieve these and other advantages and in accordance with the purpose of this specification, as embodied and broadly described herein, there is provided a mobile terminal, comprising a display, a memory including information regarding a plurality of different payment interfaces, and a controller configured to identify user action associated with a purchase via a network, cause the display to display purchase information for a product in response to a user request, and perform payment for the product using a payment interface after a request for payment of the product is received, wherein the payment interface is selected from among the plurality of different payment interfaces based on the identified user action, wherein the user action occurs prior to the receiving of the request for payment of the product.

The plurality of different payment interfaces include a first payment interface that allows the request for payment to be immediately made, a second payment interface that includes payment suspension in which the request for payment is suspended according to user selection or until a predetermined condition is satisfied, and a third payment interface that further provides additional information regarding the product.

The controller is further configured to perform the payment for the product using either the first payment interface or the second payment interface based on whether the user action indicates that the product currently being purchased was compared with at least one other product, wherein the comparing is determined based on whether the user action identifies that the user has accessed a same purchase page two or more times before the request for payment.

The controller is further configured to cause the display to display a graphic object indicating that the compared product is present on at least a portion of the display when the user action indicates that access of the same purchase page has been performed two or more times before the request for payment The controller is further configured to cause the display to display information regarding the number of compared products, wherein the information regarding the number of compared products is the number of purchase pages that do not overlap each other and that have been accessed as indicated by the user action.

The controller is further configured to cause the display to display information regarding the purchase pages accessed after the user conducts an action associated with the purchase of the product and before the performing of the payment.

Wherein, the information regarding the purchase pages further includes link information regarding the purchase pages, and wherein the controller is further configured to access any one of the purchase pages based on the link information corresponding to the selected information, and cause the display to display a screen associated with the accessed purchased page, when any one item of the information regarding the purchase pages is selected by the user.

The controller is further configured to determine an action of the user accessing the purchase page as an action associated with the product purchase when a purchase page for purchasing the product is accessed, wherein the purchase page is either a web page predetermined as allowing the product purchase, a web page of a web site predetermined as allowing the product purchase, or a web page including information regarding the product purchase.

The controller is further configured to allow the payment to be made through the third payment interface when the request for payment for the product is requested through a purchase page accessed in a predetermined way.

Wherein, the predetermined way is a way in which the purchase page is accessed through an advertisement displayed in a form of a pop-up or banner, or a way in which the purchase page is accessed through a specific character string, or an image in which the link information regarding the purchase page is set.

Wherein, the third payment interface provides further information regarding purchase details of a product identical or similar to the product currently being purchased, and the information regarding the purchase details includes information regarding at least one of a price, an image, or a purchase time of the same or similar product.

Wherein, the purchase details include information regarding products that have been successfully purchased for a predetermined time, and wherein the controller is further configured to determine whether the product identical or similar to the product currently being purchased is present among the products that have been successfully purchased for the predetermined time based on at least one of a kind, a name, a color, a manufacturer, or a brand of the product currently being purchased.

The controller is further configured to allow the requested payment to be made through any one of the first payment interface, the second payment interface, or the third payment interface based on whether a screen associated with execution of a specific function, or a screen associated with a specific operation state, is displayed on the display, or whether a predetermined time has elapsed.

Wherein, the predetermined time is a time previously set to automatically switch the display to an inactive state.

The controller is further configured to suspend the performing of the payment for a predetermined time, and proceed with the payment process after the predetermined time expires, and cancel the performing of the payment, or proceeding with the performing of the payment, based on a user input sensed for the predetermined time.

The controller is further configured to cause the display to display a graphic object for indicating an elapse of the predetermined time, and cancel the performing of the payment based on a touch input received at the displayed graphic object.

The controller is further configured to cause the display to display at least one character corresponding to remaining time of the predetermined time.

The controller is further configured to cause the display to display payment detail information including a payment cancellation menu for selecting cancellation of a completed payment based on whether a predetermined condition is satisfied, and allow the request for payment to be approved based on whether a user input is applied to the payment cancellation menu.

There is a purchase method performed at a mobile terminal having a display, the method comprising identifying user action associated with a purchase via a network, determining a product purchase type based on identified user action, identifying a request to pay for the product, selecting a payment interface from among a plurality of different payment interfaces based on the determined product purchase type of the user, and performing payment for the product using the selected payment interface.

The performing of the payment comprises suspending a process for the payment for a predetermined time, and proceeding with the performing of the payment when the predetermined time has expired, and wherein the suspending of the payment process comprises sensing a user input for the predetermined time, and cancelling the performing of the payment or proceeding with the performing of the payment before the predetermined time has expired, based on the user input.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
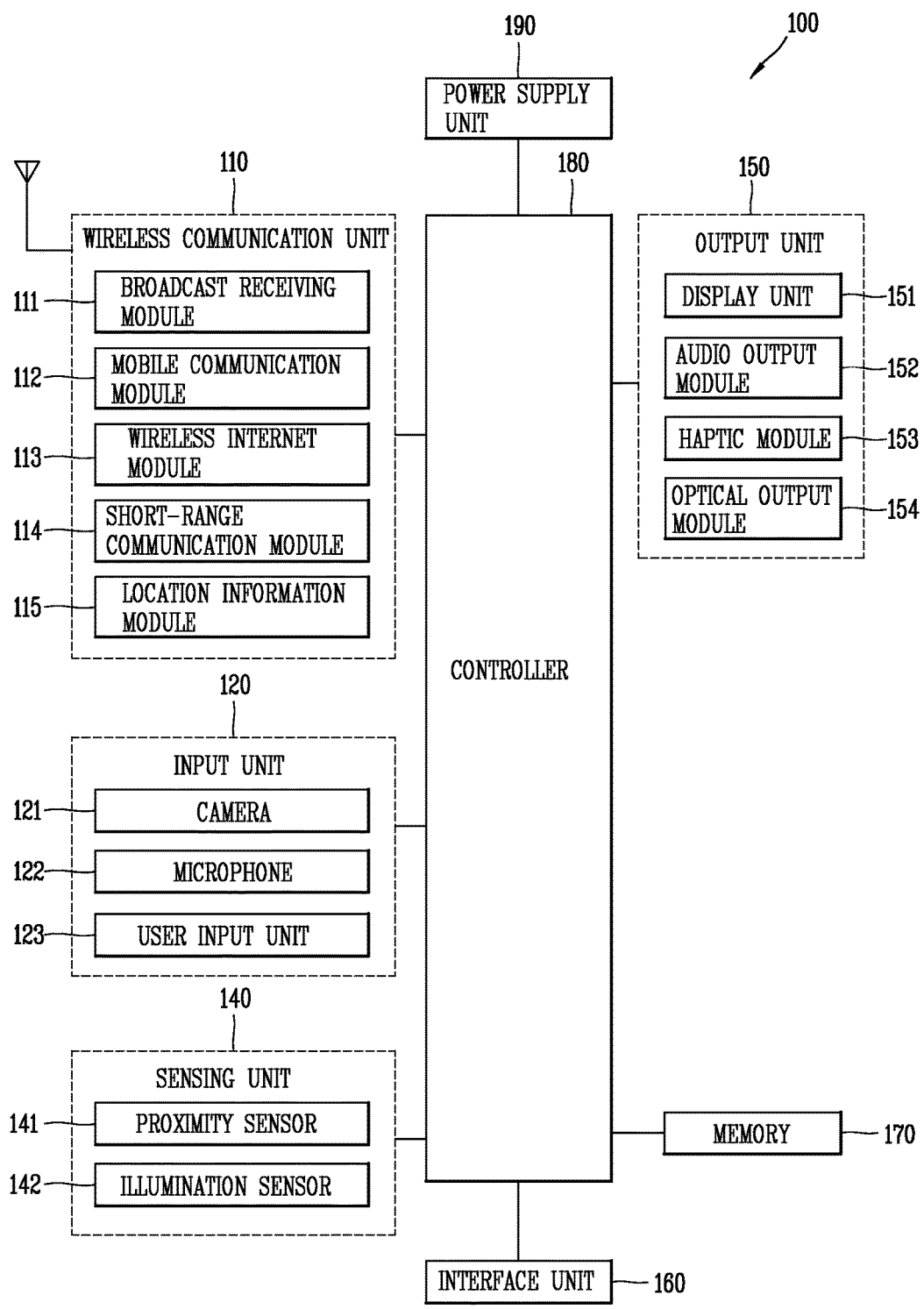
FIG. 1 is a block diagram illustrating a mobile terminal associated with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the body, or configured to be detachable from the body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well. In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity.

In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal For instance, the short-range communication module 114 of a mobile terminal 100 may sense or recognize a wearable device that is near-enough to communicate with the mobile terminal In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Various embodiments described herein may be implemented in a computer-readable medium, a machine-readable medium, or similar medium using, for example, software, hardware, or any combination thereof.

Figure 2:
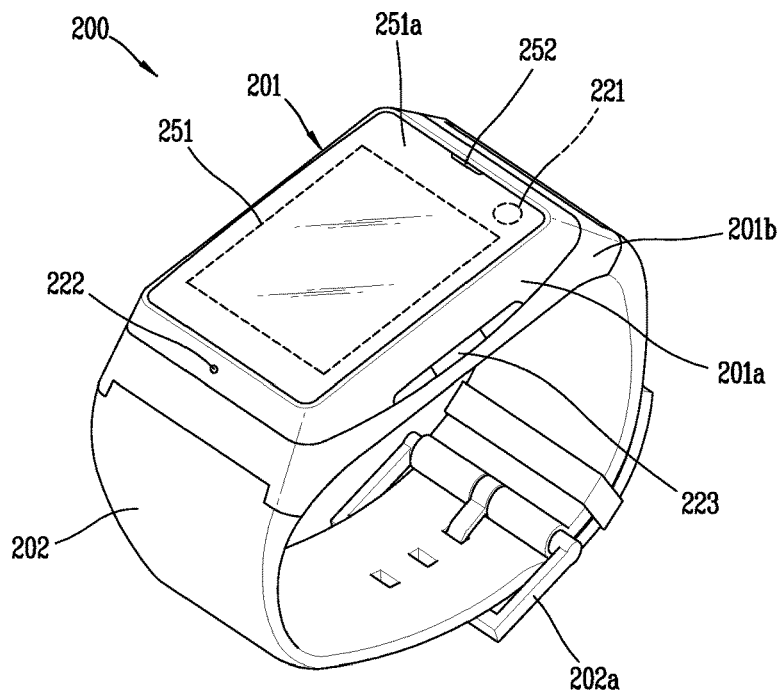
FIG. 2 is an exemplary diagram showing a mobile terminal implemented in the form of a watch according to an embodiment of the present invention.

FIG. 2 is a perspective view illustrating one example of a watch-type mobile terminal 200 in accordance with another exemplary embodiment. As illustrated in FIG. 2, the watch-type mobile terminal 200 includes a main body 201 with a display unit 251 and a band 202 connected to the main body 201 to be wearable on a wrist. In general, mobile terminal 200 may be configured to include features that are the same or similar to that of mobile terminal 100 of FIG. 1.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201*a* to form a front surface of the terminal body together with the first case 201*a*.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202*a*. The fastener 202*a* may be implemented into a buckle type, a snap-fit hook structure, a Velcro® type, or the like, and include a flexible section or material. The drawing illustrates an example that the fastener 202*a* is implemented using a buckle.

Hereinafter, a control method which may be implemented in a mobile terminal will be described in detail with reference to the accompanying drawings. It is obvious to those skilled in the art that the present invention may be embodied in another specific form without departing from the spirit and scope of the present invention.

Figure 3:
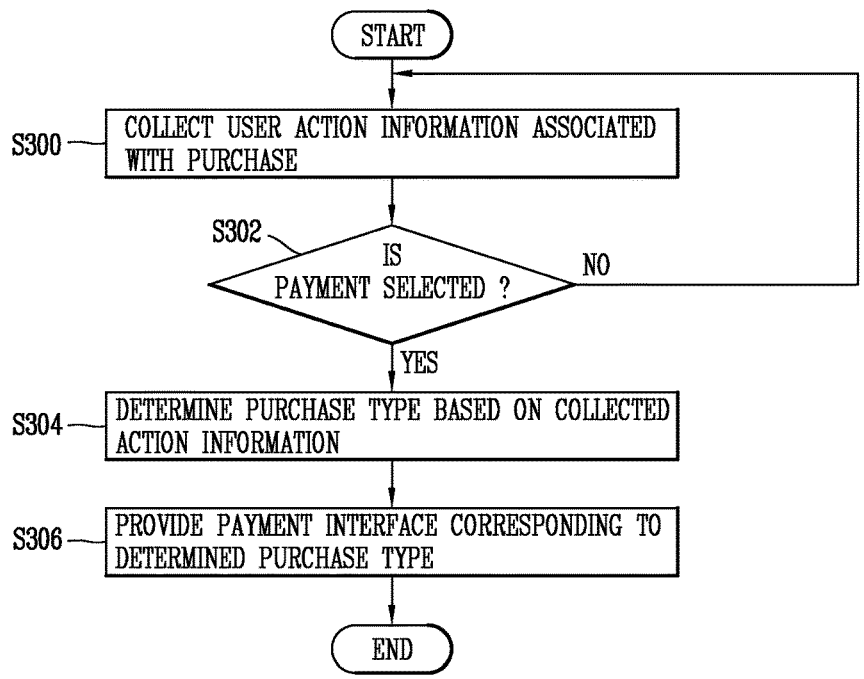
FIG. 3 is a flowchart showing a process of providing a different payment interface according to a user purchase type, in a mobile terminal according to an embodiment of the present invention.

First, FIG. 3 is a flowchart showing a process of providing a different payment interface according to a user purchase type in a mobile terminal according to an embodiment of the present invention.

Referring to FIG. 3, a control unit 180 of a mobile terminal 100 according to an embodiment of the present invention may collect information regarding a user action associated with a purchase (S300). Here, the user action associated with the purchase may denotes an action of the user visiting a web page in which the product may be purchased or an action of the user staying in a web page in which the product may be purchased after visiting the web page.

In this case, the control unit 180 may collect information regarding whether the user has visited the same web page or information regarding the number of visits to the web page as the user action associated with the purchase. Alternatively, the control unit 180 may collect information obtained by measuring a period during which the user stays in the web page as the user action associated with the purchase.

The web page in which the product may be purchased may be a predetermined web page or a web page of a predetermined website. Alternatively, when a web page accessed by a user includes information (e.g., a payment-related tap) associated with a product purchase as a result of parsing the web page during the user web browsing, it will be appreciated that the currently accessed web page may be determined as the web page from which the product may be purchased. In the following description, the web page in which the product may be purchased will be referred to as a purchase page.

The control unit 180 may determine whether payment for a product purchase of the user is requested while collecting the information regarding "the user action associated with the purchase" in S300 (S302). When the determination result in S302 is that the payment is not requested, the processing proceeds back to S300, and the control unit 180 may collect the information regarding the user action associated with the purchase again. On the other hand, when the determination result in S302 is that the payment is requested, the control unit 180 may determine a user purchase type corresponding to the currently requested payment on the basis of the user action collected in S300 (S304).

For example, the control unit 180 may classify a case in which a user purchases a product without comparison with other products and a case in which a user purchases a product after comparison with other products as different purchase types (i.e., a first purchase type and a second purchase type). Moreover, the control unit 180 may classify a case in which a user purchases a product through a purchase site connected in at least one predetermined way (e.g., through an advertisement) as another purchase type (i.e., a third purchase type).

The classification of the purchase types may be determined according to the user action information collected in S300. For example, when the user has repeatedly visited a purchase page visited by the user at least one or more times before the payment is requested in S302, the control unit 180 may determine that the user has performed at least one comparison before purchasing the product. Then, the control unit 180 may determine that the user carefully considers the purchase before purchasing the product and may determine such a user purchase type corresponding to the currently requested payment as a careful purchase type (i.e., the second purchase type).

On the other hand, when the user does not repeatedly visit a purchase page, which the user has visited, before the payment is requested, the control unit 180 may determine that the user purchases a product without comparison with other products. Then, the control unit 180 may determine such a user purchase type corresponding to the currently requested payment as a simple purchase type (i.e., the first purchase type).

The control unit 180 may determine whether the purchase page corresponding to the requested payment is a web page accessed in a predetermined way. For example, the control unit 180 may determine whether the purchase page is a web page connected through a predetermined advertisement medium, that is, a banner advertisement or pop up advertisement or a web page connected through link information, for example, a text link. When the payment for a predetermined product is requested using the purchase page accessed through such an advertisement medium or text link, the control unit 180 may determine such a user purchase type corresponding as an impulse purchase type (i.e., the third purchase type).

In S304, when the user purchase type corresponding to the currently requested payment is determined, the control unit 180 may provide different payment interfaces depending on the determined purchase type (S306).

The different payment interfaces may provide different payment methods (e.g., options) or different information, which is selectable by users. For example, when the determined product user purchase type is the careful purchase type in which the user purchases a product after comparing one or more products with each other, the control unit 180 may provide a payment interface including a payment suspension option for suspending the payment according to the user's selection or until a predetermined condition is satisfied. Alternatively, when the user impulsively purchases a product, the control unit 180 may provide a payment interface for further providing additional information associated with a product currently being performed, thus inducing the user to carefully purchase the product.

Various payments interfaces provided by the mobile terminal 100 according to an embodiment of the present invention will be illustrated below with reference to FIGS. 4 to 12. In the following description, it is assumed that the mobile terminal 100 according to an embodiment of the present invention is implemented in the form of a watch. However, the present invention is not limited thereto. It will be appreciated that the present invention may also be applied to a mobile terminal implemented in the form of a smart glass or smart lens as well as a bar-type or folder-type mobile terminal.

As described above, a simple purchase denotes a purchase type in which a user purchases a product without comparison with other products. For example, when the user conducts the action associated with the product purchase, the control unit 180 may use information regarding purchase pages accessed according to the action to determine whether the user has accessed the same purchase page. Then, the control unit 180 may provide a payment interface corresponding to the simple purchase type or the careful purchase type on the basis of a result of the determination.

Figure 4:
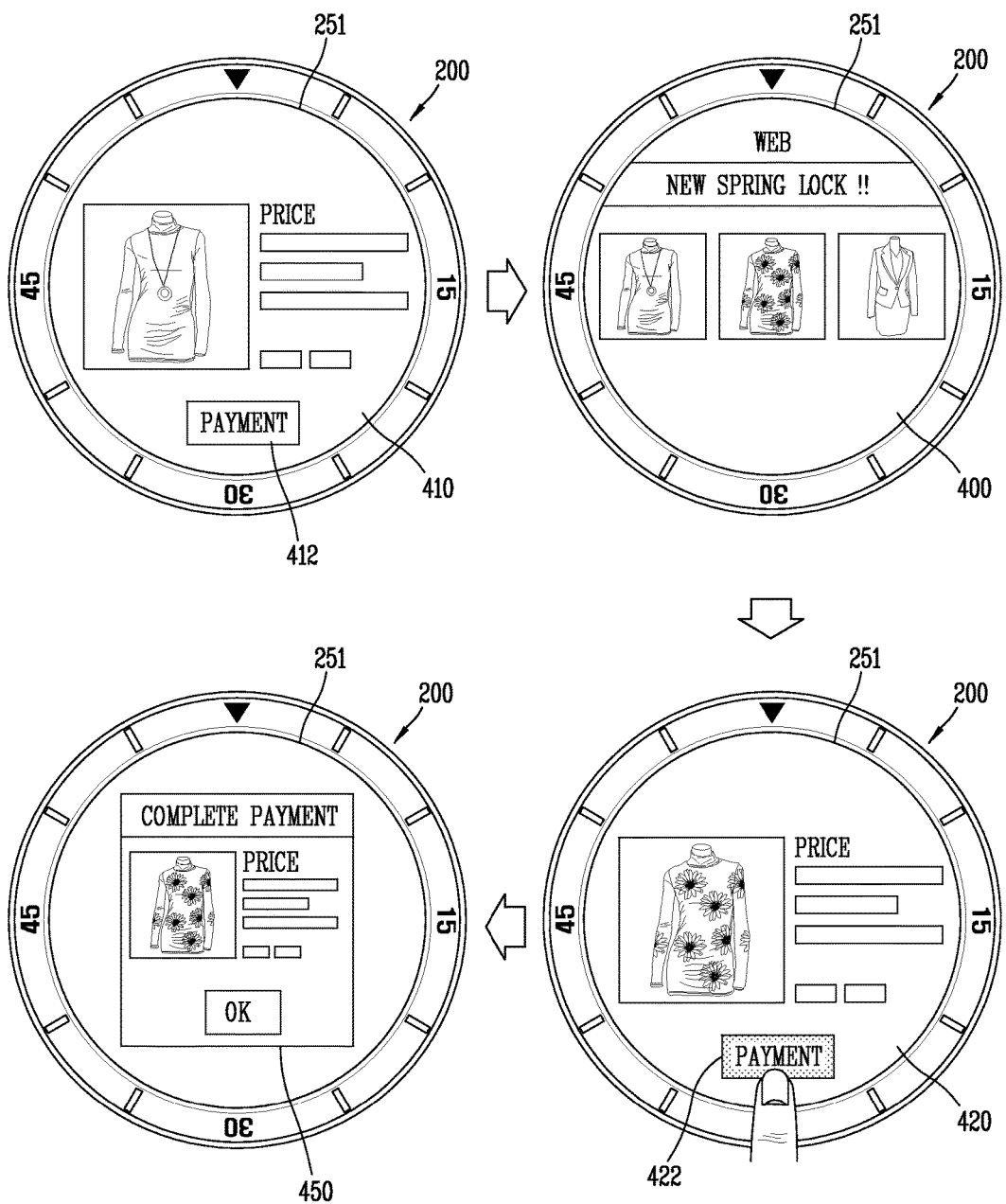
FIG. 4 is an exemplary diagram illustrating a payment interface provided in a mobile terminal according to an embodiment of the present invention.

First, FIG. 4 illustrates an interface provided when the product user purchase type is the simple purchase as a payment interface provided by the mobile terminal 200 according to an embodiment of the present invention.

Referring to FIG. 4, when a purchase page (hereinafter referred to as a first purchase page) 410 is accessed, a control unit 180 of a mobile terminal 200 according to an embodiment of the present invention may display a product information screen, such as a screen shown in a first figure of FIG. 4, included in the first purchase page 410 on the display unit 251. The product information screen may include a variety of information associated with a specific product, for example, information regarding a product image or price and may further include at least one graphic object (hereinafter referred to as a payment key) 412 associated with a payment function.

When the first purchase page 410 is accessed, the control unit 180 may determine an action of a user accessing the first purchase page 410 as "the user action associated with the product purchase." Then, the control unit 180 may collect information associated with the user action. That is, the control unit 180 may collect address information of the web page accessed according to the user action and may determine from the collected address information whether the user has previously accessed the same purchase page. When the user accesses the purchase page, the control unit 180 may measure a time for which the purchase page is accessed.

when the user requests payment without at least one reaccess to the same purchase page in the state as shown in the first figure of FIG. 4, the control unit 180 may determine that the user purchases a corresponding product without comparison with other products. That is, when a purchase site 400 including link information regarding a plurality of purchase pages or another purchase page (i.e., a second purchase page) 420 connected through the purchase site 400 is accessed while the first purchase page 410 is accessed as shown in the first figure of FIG. 4, the control unit 180 may determine that the user has not revisited the first purchase page 410.

When the user selects a payment key 422 included in a product information screen of the second purchase page 420 without revisiting the first purchase page 410, the control unit 180 may determine that the user purchases a product in a simple purchase way in which the product is purchased without comparison with other products. In this case, as shown in the fourth figure of FIG. 4, the control unit 180 may performs a payment function according to an input of the payment key 422. As a result of performing the payment function, the control unit 180 may display purchase details, that is, payment detail information 450 including a currently purchased product and a variety of information regarding the purchased product, such as the prices and number of products, on the display unit 251.

As shown in FIG. 4, when the previously accessed purchase page has been reaccessed at least one time, the control unit 180 may determine that the user compares information included in the a plurality of different pages, that is, products or information regarding the products, with each other. When the payment request of the user is sensed after the previously accessed purchase page is reaccessed at least one time, the control unit 180 may determine that the user carefully considers a purchase before purchasing the product and may determine a user purchase type corresponding to the currently requested payment as a careful purchase type.

Figure 5:
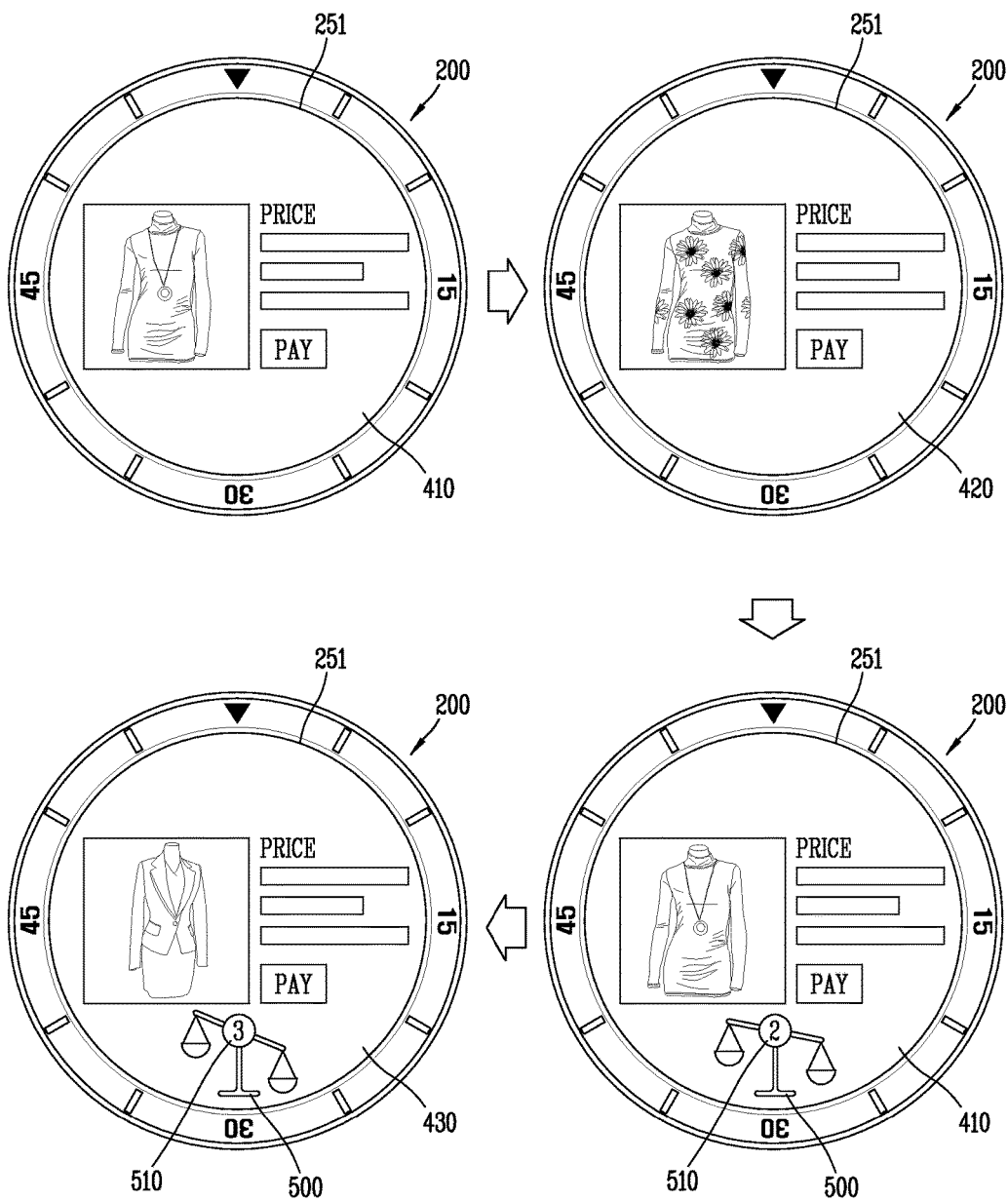
FIGS. 5 to 7 are exemplary diagrams illustrating another payment interface provided in a mobile terminal according to an embodiment of the present invention.
Figure 6:
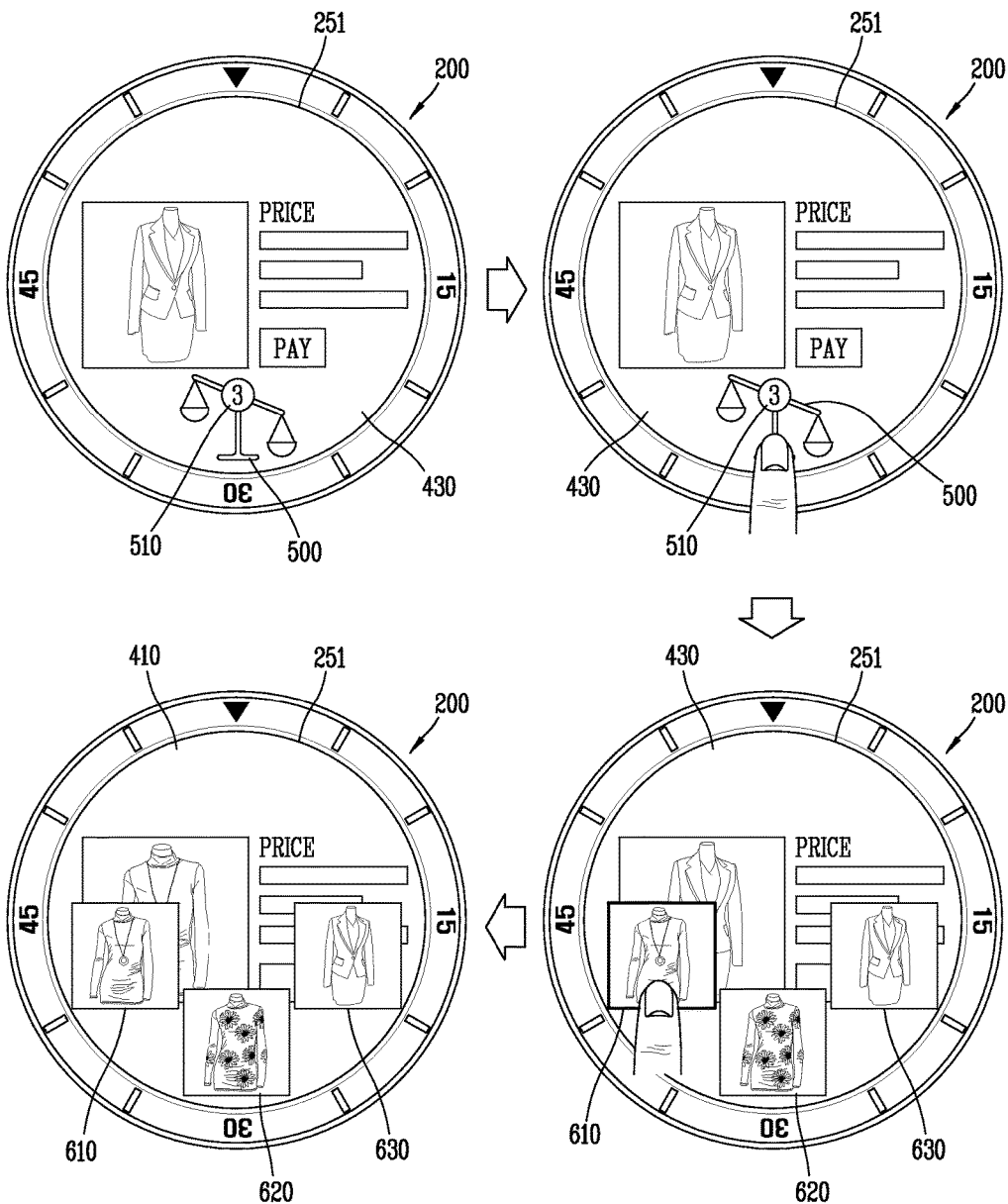
Figure 7:
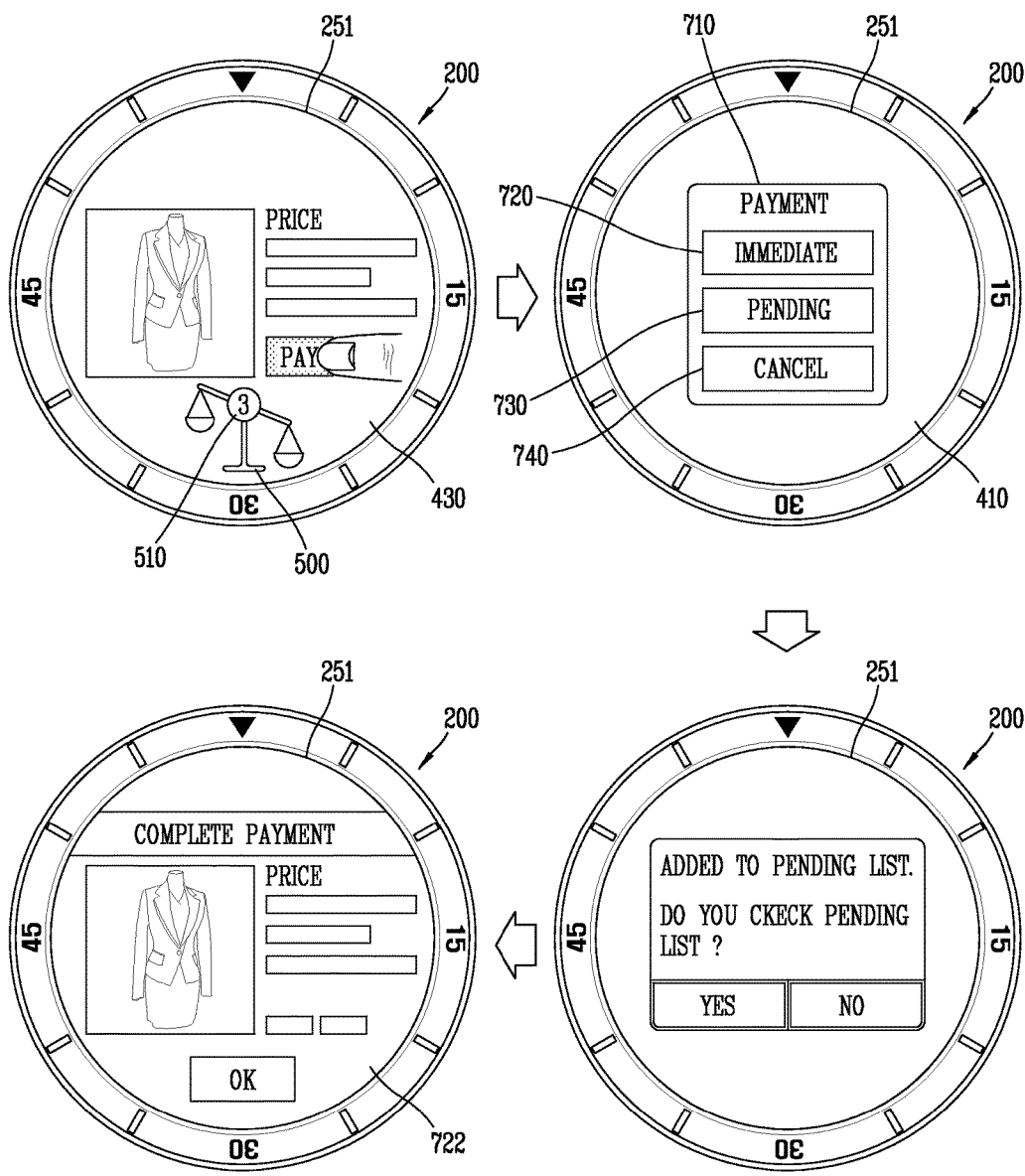

FIGS. 5 to 7 illustrates an interface provided when the product user purchase type is the careful purchase as a payment interface provided by the mobile terminal 200 according to an embodiment of the present invention.

First, as shown in the first to third figures of FIG. 5, when the second purchase page 420 is accessed and then the first purchase page 410 is reaccessed after the first purchase page 410 is accessed, the control unit 180 may determine an action of the user revisiting the previously visited purchase page as an action for product comparison. Then, the control unit 180 may notify the user that there are compared products in various methods. To this end, as shown in the third figure of FIG. 5, the control unit 180 may display a separate graphic object 500 on at least a portion of the display unit 251.

Here, the graphic object 400 may also include the number 512 of compared products. In this case, the number of compared products may be the number of purchase pages, including the reaccessed purchase page, which the user has visited in order to purchase a product. That is, after 'the user action associated with the purchase' is sensed, the control unit 180 may display the number of web pages corresponding to the purchase pages among web pages accessed according to the user action as the number of compared products. The determined number of purchase pages may be displayed in at least a region of the display unit 251, and more preferably, in at least a portion of the display unit 251 in which the graphic object 500 is displayed.

Accordingly, as described above, when the second purchase page 420 is accessed and then the first purchase page 410 is reaccessed after the first purchase page 410 is initially accessed (i.e., the user action for the purchase), as shown in the third figure of the FIG. 5, the number of purchase pages (i.e., the first purchase page 410 and the second purchase page 420), that is, two may be displayed on the display unit 251 as the number of compared products 512.

Here, the number of compared products 512 may be determined on the basis of the collected user action information after the user initially conducts "the action associated with the purchase." The user action information may be collected in S300 of FIG. 3, and S300 of FIG. 3 may be initialized on the basis of whether a predetermined condition is satisfied.

The predetermined condition may be the elapse of a certain period of time or the completion of the payment. Accordingly, when the user moves to a web page or web site irrelevant to the product purchase and thus does not access the purchase page for a certain time or more, or the payment process for purchasing a specific product is completed although the purchase page has been accessed, the control unit 180 may initialize a process of collecting the user action information on the basis of this. When the initialization is performed, information regarding purchase pages visited by the user may also be initialized.

Accordingly, the number of compared products 512 may be the number of purchase pages that do not overlap each other and that have been visited by the user after the user conducts an action associated with the purchase initially or first after initialization, for example, the user visits the first purchase page 410 and before the collected user action information is initialized, and may be displayed on the display unit 251 in addition to the separate graphic object 500 when any one of the previously accessed purchase pages is reaccessed according to the user action.

Accordingly, as shown in the fourth figure of FIG. 5, when a new purchase page, that is, a third purchase page 430 is accessed, the number of compared products 512 may increase by adding the new purchase page 430. However, when the purchase page (e.g., the first purchase page 410) that has been previously visited by the user is reaccessed, instead of the new purchase page, the number of compared products 512 may be maintained at the currently displayed number, that is, two. This is because the purchase pages that the user has visited so far are only the first and second purchase pages.

It will be appreciated that the control unit 180 of the mobile terminal 200 according to an embodiment of the present invention may provide link information regarding the purchase pages having been visited for product comparison by the user. FIG. 6 illustrates such a case.

First, a graphic object 500 for displaying the presence of the compared products and the number 512 of compared products are displayed as shown in the first and second figures of FIG. 6. In this case, when there is a user input on at least one of the graphic object 500 and the number 512 of compared products, the control unit 180 may provide information on at least one link to purchase pages corresponding to the compared products in response to the user input.

For example, the link information may correspond to the purchase pages having been visited by the user before the process of collecting the user action information is initialized and may be displayed on the display unit 251 in various ways. That is, the control unit 180 may display the purchase pages or thumbnail images corresponding to product information (e.g., product images) extracted from the purchase pages in at least a region of the display unit 251. In addition, the control unit 180 may display information regarding purchase sites corresponding to the purchase pages through an icon or a separate graphic object, text, or the like.

Here, the purchase site may denote a web site including the link information regarding the plurality of purchase pages. The purchase pages that have been visited by the user before the process of collecting the user action information is initialized may be connected through different purchase sites. In this case, the control unit 180 may display information (e.g., icons, graphic objects, or texts corresponding to the purchase sites) regarding different purchase sites corresponding to the purchase pages on the display unit 251, in response to the user input on at least one of the graphic object 500 and the number 512 of compared products.

Thus, as shown in the third figure of FIG. 6, information 610, 620, and 630 regarding the purchase pages having been visited for the product comparison by the user may be displayed on the display unit 251. In this case, when the purchased pages having been visited for the product comparison by the user are formed according to a process shown in FIG. 5, the purchase pages may be the first purchase page 410, the second purchase page 420, and the third purchase page 430. Then, the information 610, 620, and 630 corresponding to the purchase pages shown in the third figure of FIG. 6 may correspond to the first purchase page 410, the second purchase page 420, and the third purchase page 430.

In this state, when the user selects any information, the control unit 180 may directly access a purchase page corresponding to the selected information. That is, as shown in the third figure of FIG. 6, when the user selects first information 610, the control unit 180 may directly access the first purchase page 410 in response to the selection. Thus, the present invention may allow the user to conveniently check information regarding products desired to be compared. The fourth figure of FIG. 6 shows such an example.

When it is determined that there is the user action for product comparison, the control unit 180 may determine, from the user action, that the user purchase type is a careful purchase. When the payment is requested using the currently accessed purchase page, the control unit 180 may provide a payment interface corresponding to the currently determined purchase type, that is, the careful purchase type to the user. Unlike the interface shown in FIG. 4, the payment interface corresponding to the careful purchase type may include a selection menu for allowing the user to select any one of a plurality of different payment ways. Next, FIG. 7 illustrates a payment interface including such a selection menu.

First, referring to the first figure of FIG. 7, a graphic object 500 for displaying the presence of the compared products and the number 512 of compared products are displayed as shown in the fourth figure of FIG. 5. When the user selects payment for the currently accessed purchase page, the control unit 180 may display a screen based on a payment interface corresponding to the currently determined user purchase type, that is, the careful purchase type on the display unit 251. In this case, the payment interface corresponding to the careful purchase type may include a menu screen 710 for selecting immediate payment (Immediate) 720, payment suspension (Pending) 730, and payment cancellation (Cancel) 740, as shown in the second figure of FIG. 6.

Here, the immediate payment 720 may denote a payment way in which a payment process is performed immediately when the immediate payment 720 is selected. In this case, the immediate payment 720 may be a direct payment, such as a one-click way, without a process of receiving confirmation or additional information. As shown in the fourth figure of FIG. 7, when the immediate payment 720 is selected, information regarding the product purchased by the user, that is, payment detail information 722 may be displayed on the display unit 251 at the same time the payment is made.

Meanwhile, the payment suspension 730 may be a payment way in which the payment process has been suspended until a predetermined condition is satisfied. Here, the predetermined condition may be determined variously depending on the time or the user's position. That is, the payment suspension 730 may denote a payment way in which the user can select payment or payment cancellation before a certain time elapses, the user is located at a predetermined place, or a specific time period is entered.

When the payment suspension 730 is selected, the control unit 180 may provide information regarding items of payments have been suspended to the user whenever the user requests the information. The control unit 180 may allow the user to simultaneously delete or immediately pay for at least some of the items of which payments have been suspended. To this end, the control unit 180 may manage items selected for the payment suspension 730 in the form of a list. When the payment suspension 730 is selected on the menu screen 710, the control unit 180 may add information regarding a purchase page from which payment has been requested to a list including the items of which payments have been suspended. As shown in the third figure of FIG. 7, the control unit 180 may display the list on the display unit 251 at any time, upon the user's request.

As described above, the mobile terminal 200 according to an embodiment of the present invention may determine whether the user makes an impulse purchase on the basis of the user action information collected before the payment is requested and may provide another payment interface according to the determination.

FIGS. 8 to 12 are exemplary diagrams illustrating a payment interface provided in the mobile terminal 200 according to an embodiment of the present invention when it is determined that the user makes an impulse purchase.

Figure 8:
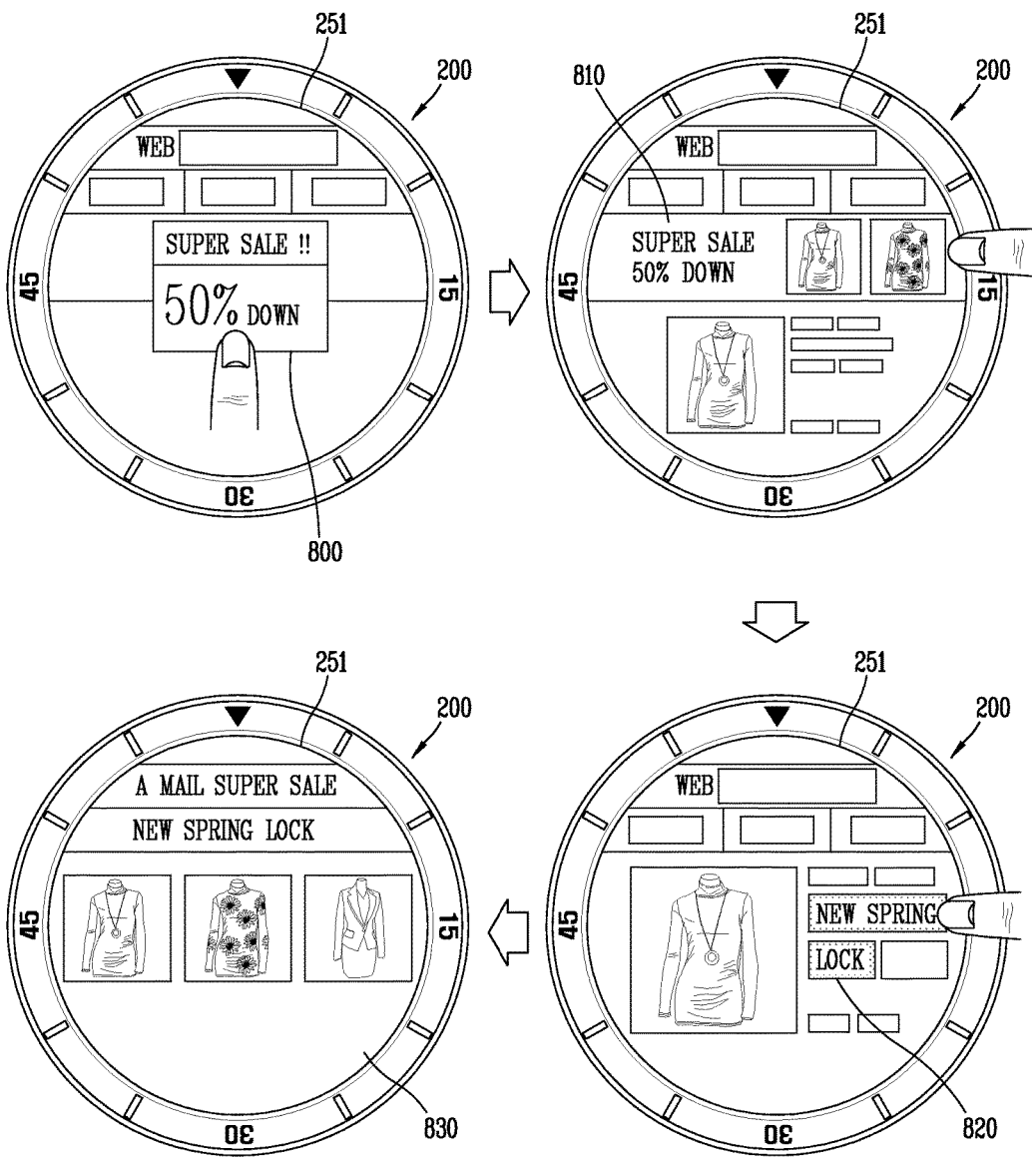
FIGS. 8 to 12 are exemplary diagrams illustrating still another payment interface provided in a mobile terminal according to an embodiment of the present invention.

First, FIG. 8 illustrates a case in which the mobile terminal 200 according to an embodiment of the present invention determines the user purchase type in which the payment is currently requested as an impulse purchase type.

The control unit 180 of the mobile terminal 200 according to an embodiment of the present invention may determine whether the requested payment is based on the impulse purchase of the user on the basis of various criteria. The criteria may include a way in which the purchase page corresponding to the requested payment is accessed.

For example, as shown in the first figure of FIG. 8, when the payment is requested using a purchase page of a purchase site accessed through an advertisement 800 which is displayed in the form of a pop-up or a purchase page directly accessed through the pop-up advertisement 800, the control unit 180 may determine that the payment is based on the impulse purchase of the user. Alternatively, as shown in the second figure of FIG. 8, when the payment is requested directly through an advertisement 810 displayed in the form of a banner or requested from the purchase page accessed via the purchase site, the control unit 180 may determine that the payment is based on the impulse purchase of the user.

This is also applied to a case in which the payment is requested from the purchase page accessed directly through a variety of link information selected while the user does web surfing or accessed via the purchase site. The link information may be information (e.g., image link information or text link information) that is predetermined such that a specific web page is connected to an image or text included in the currently accessed web page. When the user selects the image or text having the predetermined link information, connection to a specific web page may be made according to the link information. The third figure of FIG. 8 shows such an example.

When the specific web site is connected through such link information, a specific purchase site may be accessed as shown in the fourth figure of FIG. 8. In this case, when the payment for the product purchase is requested through a purchase page accessed via the purchase site accessed through the link information or the pop-up advertisement or banner advertisement, the control unit 180 may determine that payment request is based on the impulse purchase of the user.

That is, as shown in FIG. 8, when the specific purchase site or purchase page is accessed by the user selecting a pop-up advertisement or banner advertisement or a variety of link information, the control unit 180 may determine the action of the user selecting the pop-up advertisement or banner advertisement or the link information as "the action for purchase." The information regarding the purchase site or purchase page accessed according to the pop-up advertisement or banner advertisement or the link information may be the information collected in S300 of FIG. 3. When the payment is requested using the accessed purchase page, the control unit 180 may determine that the payment request is based on the impulse purchase of the user and allow a payment interface corresponding to the impulse purchase type to be provided to the user.

Figure 9:
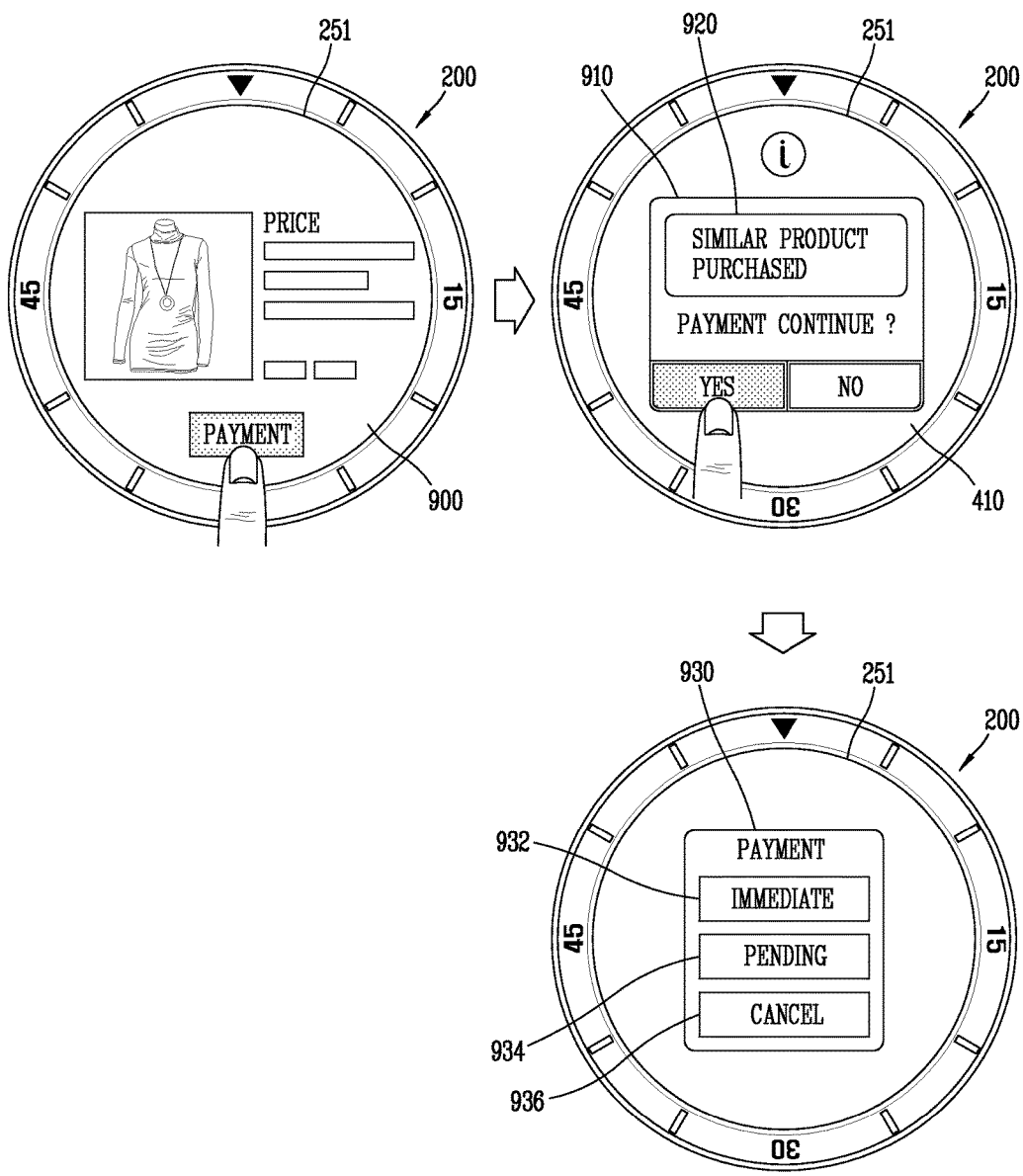

The payment interface corresponding to the impulse purchase type may provide information for preventing the impulse purchase of the user and may allow the user to select any one of a plurality of payment ways. FIG. 9 illustrates a payment interface provided when the determined user purchase type is the impulse purchase.

The first figure of FIG. 9 illustrates a case in which the payment is requested by the user in the purchase page 900 accessed in the predetermined way. In this case, as described above, the control unit 180 may display information for providing the impulse purchase of the user to the user. For example, the control unit 180 may display purchase detail information regarding a product similar to the product the user have selected to purchase on the display unit 251 as "the information for preventing the impulse purchase." The second figure of FIG. 9 shows such an example.

In order to output such information, the control unit 180 may store information associated with user payment details for a predetermined period in the memory 170. That is, the control unit 180 may extract information regarding products purchased by the user, for example, information regarding the type, name, color, manufacturer (or brand), and price of the product, from the payment details. When the purchase type determined from the user action sensed before the payment is requested, the control unit 180 may acquire information regarding a product currently requested to be purchased from a currently accessed product purchase page.

That is, the product information acquired from the purchase page may be information regarding the type, name, color, manufacturer (or brand), and price of the product requested to be purchased. The control unit 180 may retrieve a product that is the same as or similar to the product required to be purchased from information extracted from user payment details for a predetermined period. As an example, the control unit 180 may retrieve a product having the same type or name as the same product and may retrieve a product having the same type and a different color or manufacturer as the similar product. It will be appreciated that the "type" of the product may be further divided by the use of the product, that is, a place or season in which the product is mainly used.

When the product that is the same as or similar to the product currently requested to be purchased is included in the purchase details, the control unit 180 may display information 920 regarding the retrieved product, that is, a product purchased by the user within a predetermined period on the display unit 251. That is, as shown in the second figure of FIG. 9, the control unit 180 may display that the user has purchased the same or similar product within the predetermined period and may receive a selection of whether the user proceeds with the payment.

When the user selects payment cancellation in the state as shown in the second figure of FIG. 9, the control unit 180 may stop the currently requested payment process. On the other hand, when the user selects payment proceeding, the control unit 180 may display a menu screen for allowing the user to select any one of a plurality of payment ways on the display unit 251.

The menu screen 930 may be displayed as shown in the third figure of FIG. 9. That is, the menu screen 930 may include immediate payment (Immediate) 932 for immediately proceeding with the currently requested payment process, payment suspension (Pending) 934 for suspending the payment until a predetermined condition is satisfied or the payment is selected by the user, and payment cancellation (Cancel) 936 for cancelling the payment. Depending on the user's selection, the payment may be allowed to be made (Immediate 932), the information regarding the product currently requested to be paid for may be added to a list including purchase items of payments have been suspended as a new item (Pending 934), or the currently requested payment may be canceled (Cancel 936).

Figure 10:
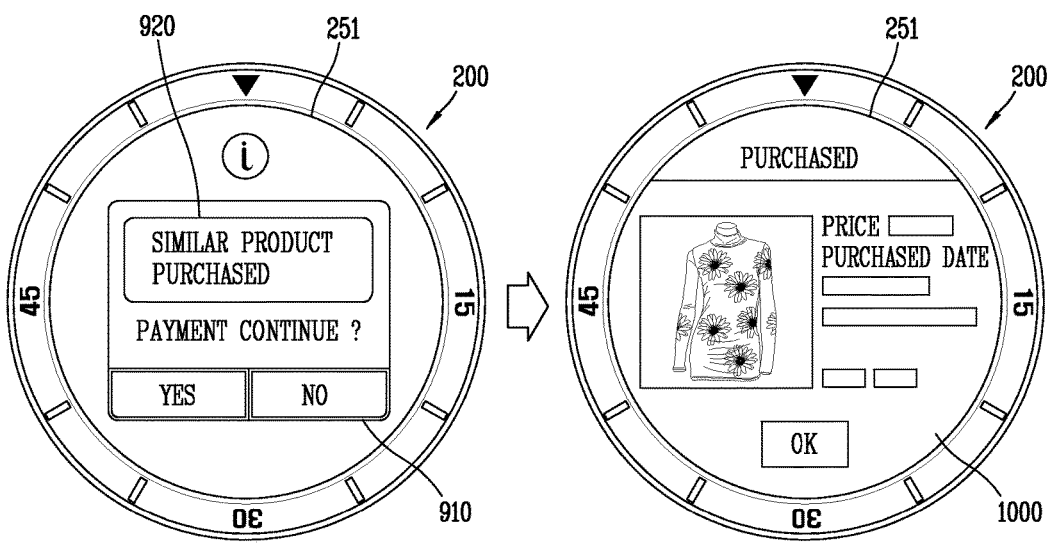

Upon the user's request, the control unit 180 may display detailed information regarding retrieved purchase details. FIG. 10 shows an example in which the detailed information regarding the retrieved purchase details is displayed.

Referring to FIG. 10, the first figure of FIG. 10 shows an example in which information 920 indicating that there is a previously purchased product that is the same as or similar to the product currently requested to be purchased is displayed, as shown in the second figure of FIG. 9. In this case, as shown in the first figure of FIG. 10, when the information 920 regarding the previously purchased product is selected by the user (e.g., a touch input), the control unit 180 may display currently retrieved purchase details, that is, detailed information regarding the product that is the same as or similar to the product currently requested to be purchased, which has been purchased with in a predetermined period, on the display unit 251. The second figure of FIG. 10 shows such an example.

The second figure of FIG. 10 shows an example in which a screen indicating detailed information regarding the retrieved purchase details is displayed on the display unit 251. Here, the detailed information screen 1000 may include a variety of information. That is, the detailed information screen 1000 include information regarding an image, price, and purchase date or time of the product that is the same as or similar to the product currently requested to be purchased among products that have been purchased during a predetermined period. Alternatively, the detailed information screen 1000 may include link information regarding a web page associated with a product included in the retrieved purchase details.

Here, the web page associated with the product may be a web page that provides detailed information regarding the product displayed on the detailed information screen 1000. Accordingly, when the user selects a product image included in the detailed information screen 1000, the control unit 180 may access the web page including the detailed information associated with the corresponding product and display the associated information on the display unit 251. Here, the web page associated with the product may be a web page including product description provided by a manufacturer of the product or a purchase page from which the user purchases the product.

Figure 11:
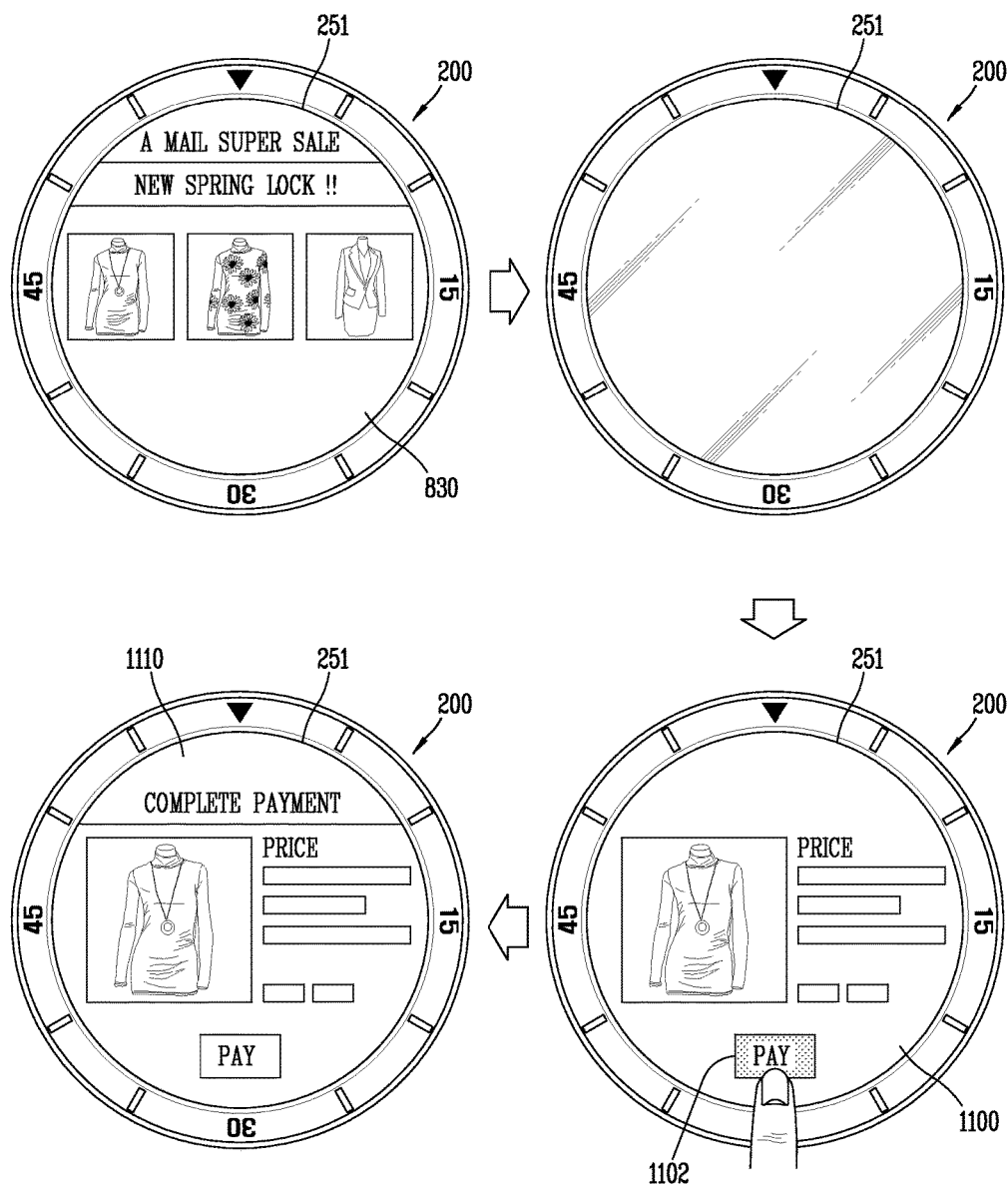
Figure 12:
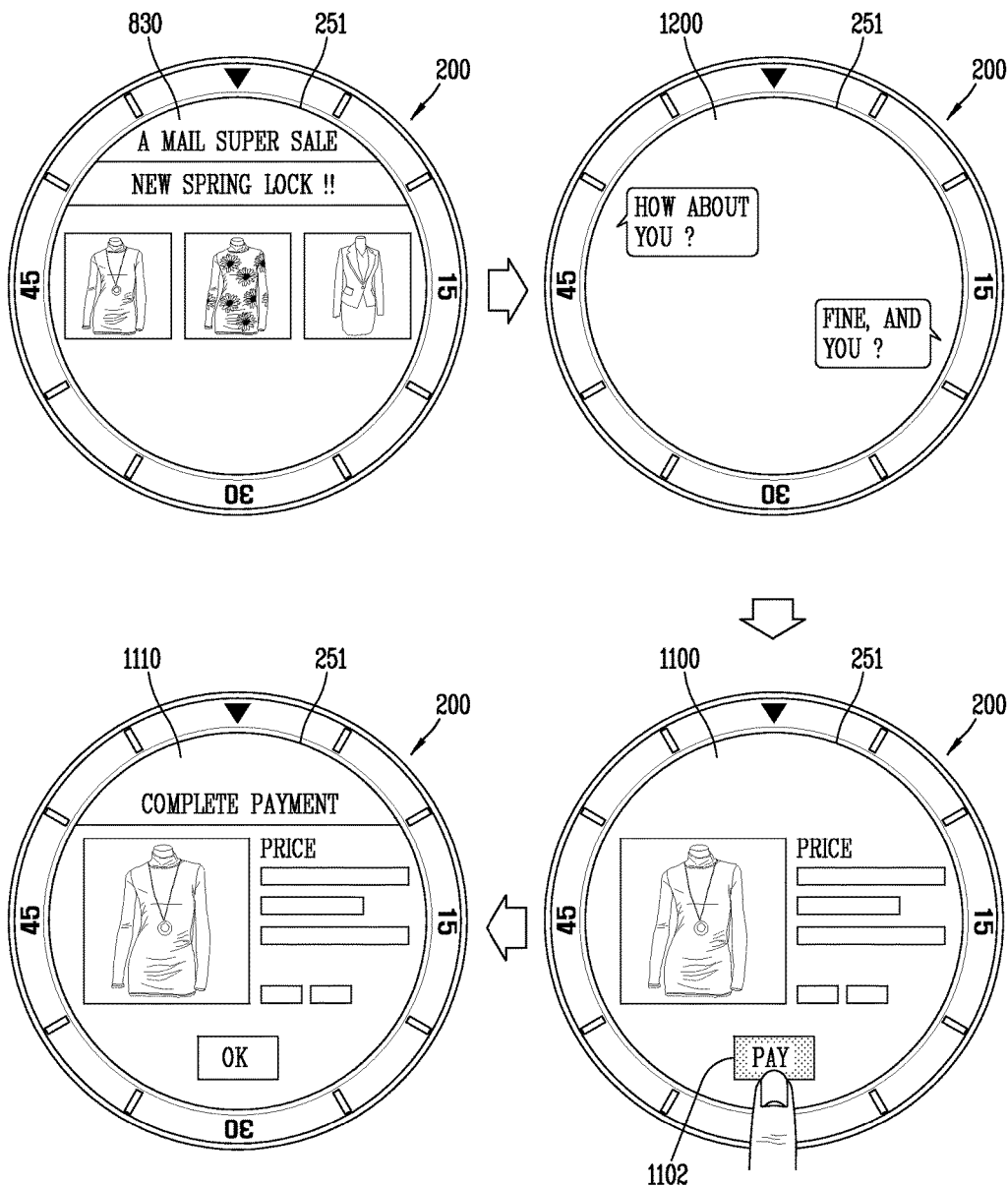

Although the currently accessed purchase page is accessed through the user action that may be determined as the impulse purchase type, it will be appreciated that the control unit 180 may determine the user purchase type differently depending on whether a predetermined condition is satisfied. That is, for example, when it is determined that the user spends sufficient time for the product purchase, the control unit 180 may determine the purchase for which payment is currently requested as a purchase type other than the impulse purchase type. The control unit 180 may determine that the user has spent sufficient time on the basis of a time for which the purchase page is accessed or a function or operating state executed by the mobile terminal 200. FIGS. 11 and 12 show this example.

First, referring to FIG. 11, the first figure of FIG. 11 shows an example in which the purchase page is accessed directly in a predetermined way, that is, through an advertisement medium or link information or accessed via the purchase site accessed through the advertisement medium or link information.

In this case, the control unit 180 may measure a time for which the user stays in the purchase page, that is, a time for which the purchase page is maintained to be accessed. When the measured time is equal to or greater than a predetermined time, the control unit 180 may determine the purchase for which payment is currently requested as a purchase type other than the impulse purchase type. In this case, the control unit 180 may determine the user purchase type as a simple purchase or careful purchase on the basis of the user action information collected before the payment is requested by the user and may provide a payment interface corresponding to the simple purchase type (see FIG. 4) and a payment interface corresponding to the careful purchase type depending (see FIGS. 5 to 7) on a result of the determination.

The predetermined time may be equal to a time (hereinafter referred to an auto turn-off time) set for the display unit 251 to be automatically switched to an inactive state in order to save power. In this case, when the user input is not sensed for the auto turn-off time or more while a specific purchase page is accessed, the control unit 180 may switch the display unit 215 into an inactive state, as shown in the second figure of FIG. 11.

The time for which the user stays in the currently accessed purchase page may be measured after the purchase page is accessed. The measured time may be collected as information regarding the user action. When the measured time excesses a predetermined time, that is, the auto turn-off time, the control unit 180 may determine the user purchase type as a purchase type other than the impulse purchase type.

That is, when the display unit 251 is activated again by a touch input of the user, and the payment is requested while the purchase page is accessed as shown in the third figure of FIG. 11,the control unit 180 may determine the user purchase type corresponding to the currently requested payment as a simple purchase type. Thus, the control unit 180 may directly proceed with a payment process in response to the requested payment (a payment interface corresponding to the simple purchase type). When the payment is completed, the control unit 180 may display information regarding payment details on the display unit 251, as shown in the fourth figure of FIG. 11.

An example in which the user purchase type is determined as the simple purchase type has been described. However, it will be appreciated that the user purchase type may also be determined as the careful purchase type. That is, unlike that shown in the third figure of FIG. 11, when the display unit 251 is activated again by a touch input of the user, and then the user revisits at least one of previously visited purchase pages, the control unit 180 may determine the user purchase type corresponding to the currently requested payment as the careful purchase type. In this case, it will be appreciated that the control unit 180 may display a menu screen including a plurality of payment ways including payment suspension on the display unit 251 in response to the requested payment (a payment interface corresponding to the careful purchase type) and may allow the payment to proceed in the payment way according to the user's selection.

An example in which the user purchase type is determined as a purchase type other than the impulse purchase according to the time for which the purchase page is accessed has been described in FIG. 11. However, it will be appreciated that the control unit 180 may determine the user purchase type on the basis of a condition other than an access time. Here, the other condition may be the execution of a specific function or the switching of a mobile terminal to a specific operating state.

Referring to FIG. 12, the first figure of FIG. 12 shows an example in which the purchase page is accessed directly in a predetermined way, that is, through an advertisement medium or link information or accessed via the purchase site accessed through the advertisement medium or link information.

In this case, the control unit 180 may execute another function or switch one operating state into another depending on the user input. The second figure of FIG. 12 shows such an example, for example, an example in which a received message is checked or a new message is written depending on the user input.

As such, when the execution of another function is performed or the switching to another operating state is performed, the control unit 180 may operate according to the other function or operating state. When the other function ends, or the operating state is restored, the control unit 180 may be switched to an original state that is before the execution of the other function or the switching to the operating state is performed. Accordingly, the mobile terminal 200 may be switched to a state in which the purchase page is accessed again in the predetermined way. In this case, when there is a payment request according to the product purchase of the user, the mobile terminal 200 may provide a payment interface in response to the payment request.

Here, the provided payment interface may not correspond to the impulse purchase type. That is, although the purchase page is accessed in the predetermined way, the control unit 180 may determine that the user spends sufficient time in purchasing the product when the execution of a specific function is performed or the switching to a specific operating state is performed depending on the user's selection, as shown in the second figure of FIG. 12.

Accordingly, the control unit 180 may display screen information based on a payment interface corresponding to a purchase type determined according to collected user actions on the display unit 251. That is, when the determined user purchase type is a simple purchase, as shown in the third and fourth figures of FIG. 12, the control unit 180 may directly proceed with a payment process (a payment interface corresponding to the simple purchase type) or may display a menu screen including a plurality of payment ways including payment suspension on the display unit 251 (a payment interface corresponding to the careful purchase type).

The function and operating state that allows the user purchase type as a purchase type other than the impulse purchase type may be predetermined That is, when a predetermined specific function is performed or the switching to a predetermined specific operating state is performed while the purchase page is accessed through an advertisement medium or link information, a screen associated with the specific function or a screen associated with the specific operating state may be displayed on the display unit 251. Then, when the same purchase page, that is, the purchase page that has previously accessed according to the advertisement medium or link information is accessed again, and the payment is requested through the purchase page, the control unit 180 may determine the user purchase type as a purchase type other than the impulse purchase type.

A one-click payment way in which the payment is immediately made when the payment is instantly requested, such as immediate payment, has been assumed in the above description. Although the immediate payment is requested, it will be appreciated that the payment may be made in different ways on the basis of a requested payment amount.

Figure 13:
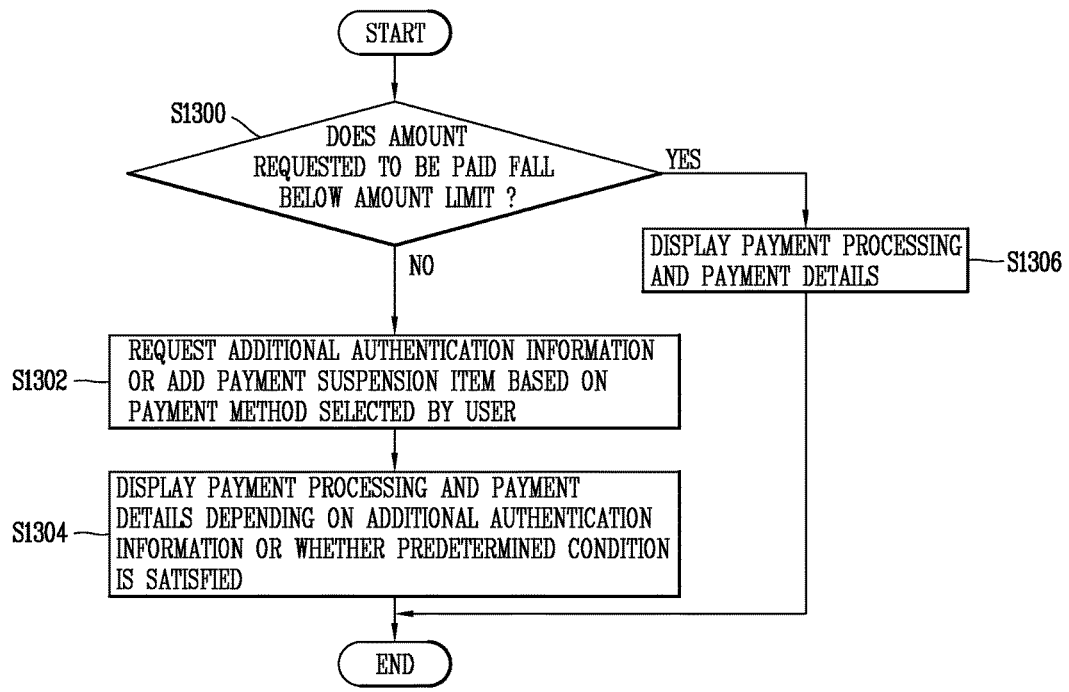
FIG. 13 is a flowchart showing a payment process performed differently depending on a payment amount requested when payment is made in a mobile terminal according to an embodiment of the present invention.

FIG. 13 shows a payment process performed differently depending on a payment amount requested when payment is made in a mobile terminal according to an embodiment of the present invention.

Referring to FIG. 13, when immediate payment is requested through a payment interface according to a currently determined user purchase type, the control unit 180 of the mobile terminal 200 according to an embodiment of the present invention may determine whether a requested payment amount falls below a predetermined payment limit (S1300). Here, the payment limit may denote the amount payable without additional user authentication.

When a result of the determination in S1300 is that the currently requested payment amount falls below the predetermined payment limit, the control unit 180 may allow immediate payment to be made. When the payment is completed, the control unit 180 may display information regarding payment details on the display unit 251 (S1306).

When the result of the determination in S1300 is that the currently requested payment amount exceeds the predetermined payment limit, the control unit 180 may request additional information from the user or suspend the payment (S1302). In S1302, the control unit 180 may request biometric information, such as finger print information or iris recognition information of the user, as additional authentication information. Alternatively, the control unit 180 may request a plurality of touch inputs having a predetermined pattern, or a predetermined character string as the additional authentication information.

When the payment suspension is selected in S1302, the control unit 180 may suspend the payment of the amount currently requested to be paid upon the user's selection or until a predetermined condition is satisfied. In this case, the control unit 180 may add items corresponding to the purchase page in which the payment is requested and its relevant information to a predetermined payment suspension list in S1302.

Here, the payment suspension list may be a list including all suspended payment requests as well as the payment request selected to be suspended in S1302. That is, the payment suspension list may include all items corresponding to the payment requests selected to be suspended through a specific payment interface. That is, as shown in the second and third figures of FIG. 7, when payment suspension (pending) 730 is selected through a payment interface corresponding to the careful purchase type, or when payment suspension (pending) 730 is selected through a payment interface corresponding to the impulse purchase type, the control unit 180 may add an item corresponding to the payment request to the payment suspension list.

The control unit 180 may pay the currently requested payment amount when the addition authentication information requested in S1302 is input or when a predetermined condition is satisfied. When the payment is completed, the control unit 180 may display payment details about the completed payment on the display unit 251 (S1304). In this case, the user action information that has been collected so far may be initialized at the same time the payment is completed.

Upon the user's request, the control unit 180 may allow the payment to be made according to at least one of items included in the payment suspension list. In this case, as in S1302, the control unit 180 may request additional authentication information and may allow the payment to be made according to whether the additional authentication information is matched with prestored information.

On the other hand, when the predetermined condition is satisfied, the control unit 180 may allow the requested payment amount corresponding to at least one item included in the payment suspension list to be paid without the additional authentication information. In this case, it will be appreciated that a plurality of payments may be made at the same time.

The payment limit in S1300 may be the amount payable without additional user authentication and may be determined differently depending on the user's current position or time that is measured when the payment is requested.

For example, the control module 180 may measure the current position of the mobile terminal 200 when the payment is requested. The control unit 180 may determine whether the measured position is a predetermined place. When the measured position is the predetermined place, the control unit 180 may set an amount corresponding to the place as a maximum amount limit that is payable immediately. Accordingly, the amount limit may be changed according to a place where the mobile terminal 200 is located, and thus it may be determined whether the immediate payment is available according to the location of the mobile terminal 200.

Amount limits corresponding to the predetermined place and the measured place may be determined in various ways. For example, the amount limits corresponding to the predetermined place and the measured place may be determined according to the user's selection. That is, the user may select a specific place, for example, any place and may set any amount corresponding to the selected place. In this case, the set amount may be a maximum amount limit that is payable in the place.

The user may set a place having a certain level of security as a safe place. The user may set a higher amount limit for the safe place or may not limit the amount thereof. When the payment is requested while the mobile terminal 200 is located in the safe place, the control unit 180 may allow the payment to proceed instantly without checking the payment limit in S1300.

As described above in S1304, when the predetermined condition is satisfied, the requested payment amount corresponding to at least one item included in the payment suspension list may be paid without the additional authentication information. Here, the predetermined condition may be that the mobile terminal 200 is located in the safe place. In this case, when it is determined that the mobile terminal 200 is located in the predetermined safe place, the control unit 180 may allow the requested payment amount corresponding to at least one item included in the payment suspension list to be paid according to the user's selection without requiring additional authentication information.

The places may be determined according to a purchase pattern of the user. For example, the control module 180 may measure the current position of the mobile terminal 200 whenever the payment is requested and may identify a place where the payment is requested a predetermined number of times or more on the basis of the measured positions. In this case, the control unit 180 may store information associated with the identified place and may determine an amount limit corresponding to the place.

In this case, the control unit 180 may determine the amount limit corresponding to the place on the basis of payment details in the identified place. For example, the control unit 180 may determine the amount limit on the basis of the average of amounts requested to be paid in the identified place or may determine the amount limit on the basis of the biggest amount among the amounts requested to be paid.

When the predetermined place is determined on the basis of the payment details of the user, a corresponding place may be determined on the basis of a predetermined criterion. That is, the control unit 180 may set the corresponding place for each branch or for each position of interest (POI) area. Alternatively, the control unit 180 may determine the corresponding place on the basis of administrative districts or adjacent buildings.

As described above, the payment amount limit may change depending on the place in which the mobile terminal 200 is located. However, it will be appreciated that the control unit 180 of the mobile terminal 200 according to an embodiment of the present invention may allow the payment amount limit to change according to the time at which the payment is requested.

For example, the control unit 180 may receive at least one specific time and an amount limit corresponding to the time from the user. In this case, the amount limit corresponding to the specific time may be different from an amount limit corresponding to another time. Accordingly, the control unit 180 may determine whether the immediate payment is made according to the amount limit corresponding to the specific time or the amount limit corresponding to the other time on the basis of whether the payment request is made at at least one specific time.

As described above in S1304, when the predetermined condition is satisfied, the requested payment amount corresponding to at least one item included in the payment suspension list may be paid without the additional authentication information. Here, the predetermined condition may be associated with a specific time. In this case, when a predetermined specific time is reached, the control unit 180 may allow the requested payment amount corresponding to at least one item included in the payment suspension list to be paid according to the user's selection without requiring additional authentication information.

Figure 14:
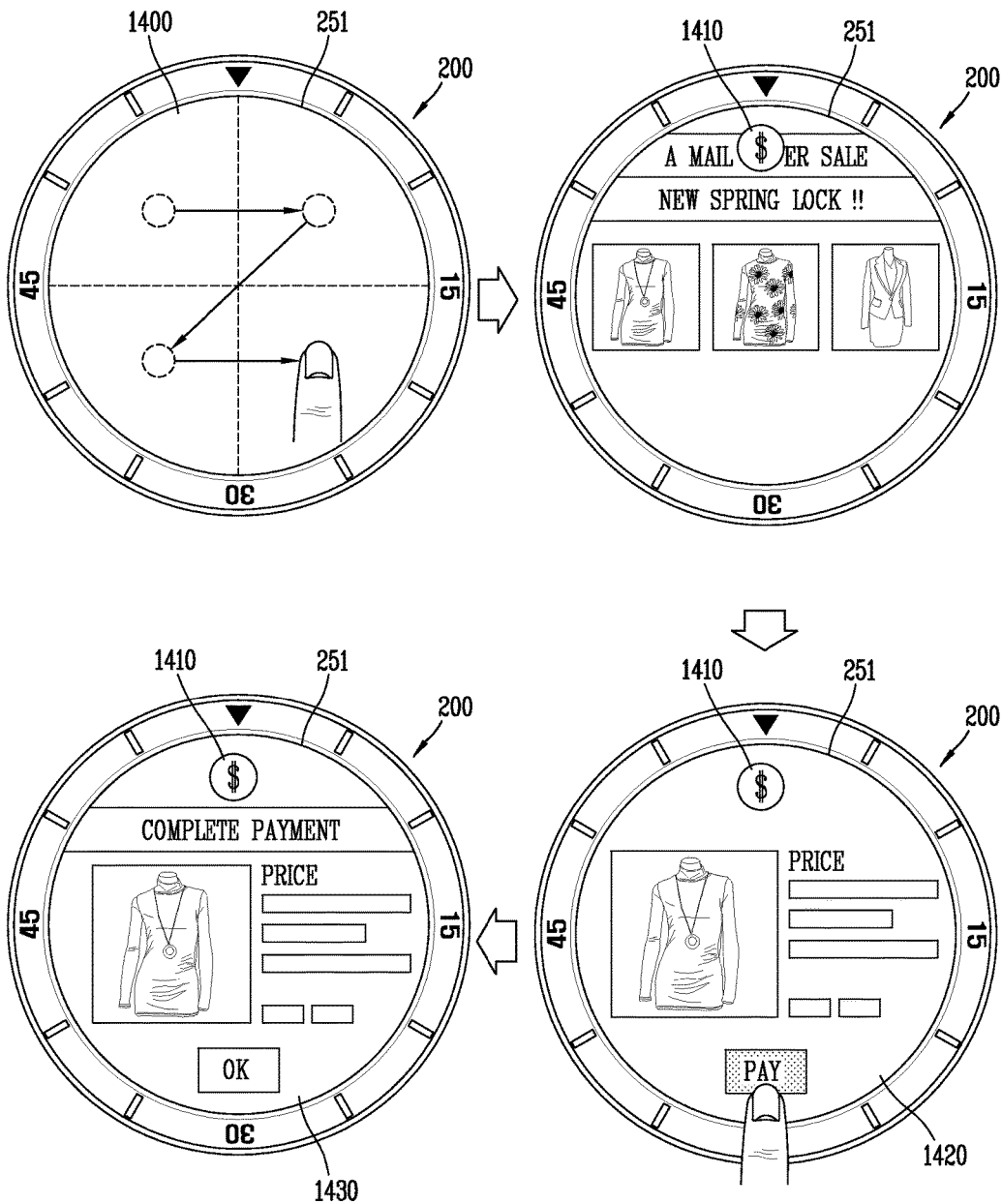
FIGS. 14 to 16 are exemplary diagrams illustrating payment processes performed when a requested payment amount falls below and exceeds a limited amount, in a mobile terminal according to an embodiment of the present invention.
Figure 15:
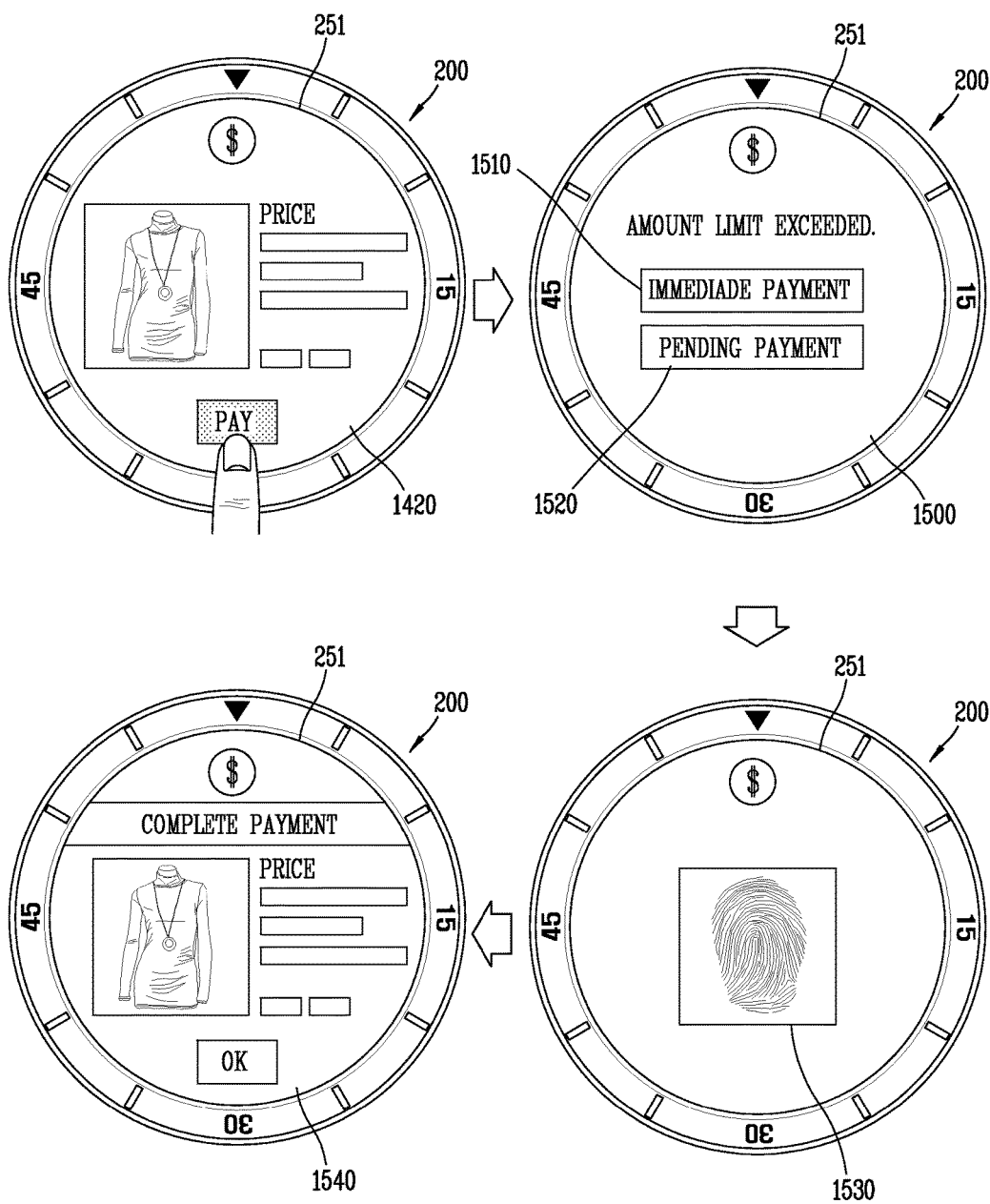
Figure 16:
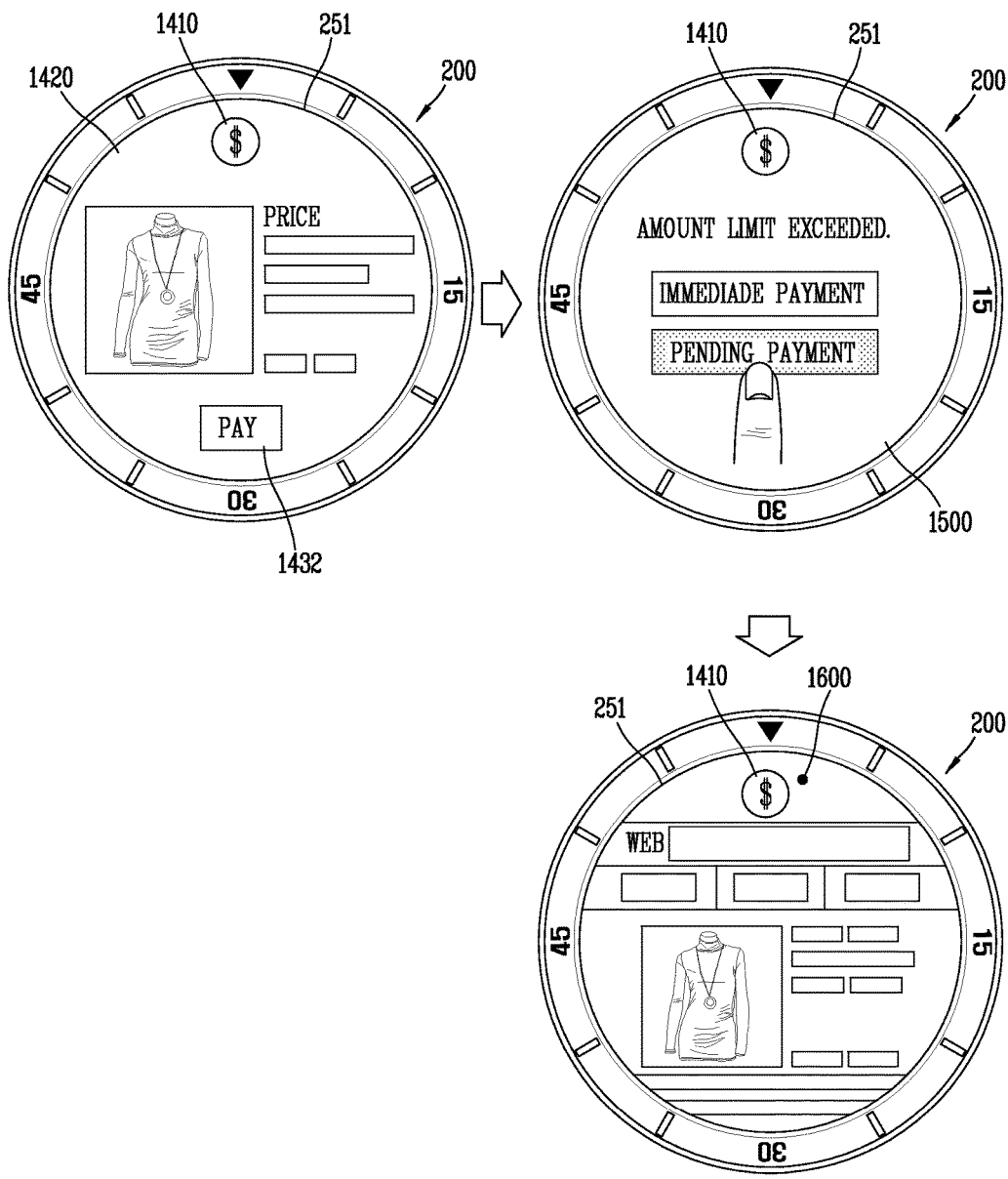

FIGS. 14 to 16 illustrate payment processes performed when a requested payment amount falls below and exceeds a limited amount, in the mobile terminal 200 according to an embodiment of the present invention As described above, the control unit 180 of the mobile terminal 200 according to an embodiment of the present invention may allow the payment to be made without the request of the additional authentication information when the amount requested to be paid does not exceed the predetermined amount limit. FIG. 14 shows such an example.

First, the first figure of FIG. 14 shows an example in which initial authentication information is received from the user. The initial authentication may be authentication information received from the user in order to maintain security or prevent theft of the mobile terminal 200 and may be input in order to release a lock state in which the execution of at least some of functions executable in the mobile terminal 200 is limited. As shown in the first figure of FIG. 14, the authentication information may be a predetermined pattern touch input applied to a plurality of regions of the display unit 251 or a password including a specific character string. Alternatively, it will be appreciated that biometric information, such as finger print information or iris recognition information of the user, may be used.

When the initial authentication information is input, the control unit 180 may display a result of the authentication. For example, the control module 180 may release a lock state of the mobile terminal 200 on the basis of the authentication result or may display that the immediate payment is available within the predetermined amount limit on the basis of the authentication result. As the second figure of FIG. 14, the control unit 180 may use at least one separate graphic object 1410 to display that the immediate payment is available.

Thus, as shown in the third figure of FIG. 14, when the user accesses a purchase page 1420 to request payment of a product purchase amount, the control unit 180 may allow the payment to be made immediately according to whether the amount requested to be paid exceeds the predetermined amount limit. That is, when the amount requested to be paid does not exceed the predetermined amount limit, the control unit 180 may allow the requested amount to be paid immediately and then may display information 1430 regarding payment details on the display unit 251 as shown in the fourth figure of FIG. 14.

Figure 17:
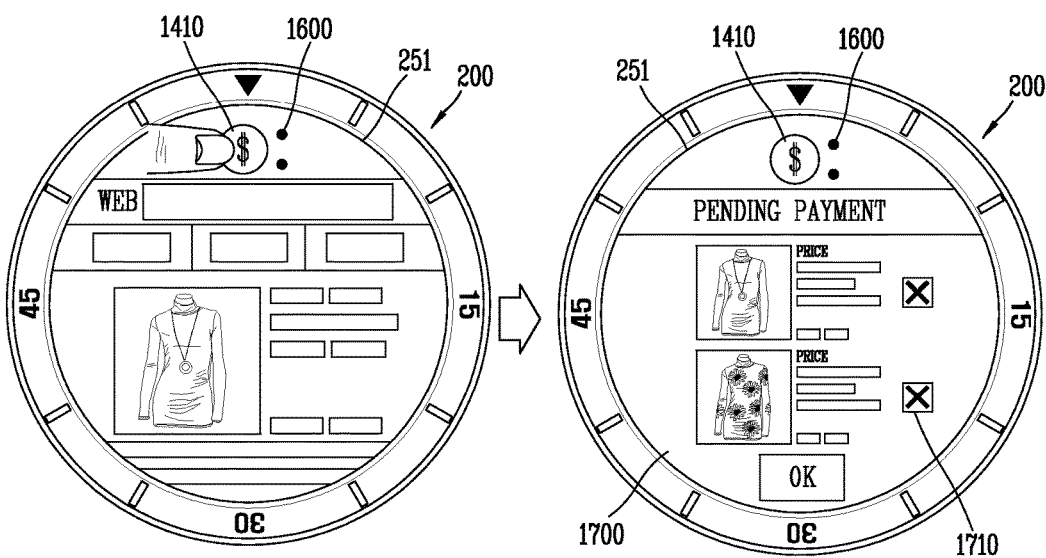
FIGS. 17 and 18 are exemplary diagrams illustrating a process of displaying payments requested to be suspended and making the payments, in a mobile terminal according to an embodiment of the invention.

However, when the amount requested to be paid exceeds the predetermined amount limit, the mobile terminal 200 according to an embodiment of the present invention may request additional authentication information from the user or suspend payment of the amount currently requested to be paid. FIGS. 15 and 17 are exemplary diagrams showing such a case.

First, referring to FIG. 15, as shown in the third figure of FIG. 14, when payment of a product purchase amount is requested by the user, the control unit 180 may determine whether the amount requested to be paid exceeds a predetermined amount limit. When a result of the determination is that the amount requested to be paid exceeds the predetermined amount limit, the control unit 180 may display information 1500 for notifying the result, as shown in the second figure of FIG. 15.

The limit excess notification information 1500 regarding the amount requested to be paid may include menus (e.g., immediate payment 1510 or pending payment 1520) to allow the user to select immediate payment or pending payment of the amount currently requested to be paid. In this case, as shown in the second figure of FIG. 15, when the user selects the immediate payment 1519, the control unit 180 may display a screen for receiving predetermined additional authentication information on the display unit 251. The third figure of FIG. 15 shows an example of a screen 1530 for receiving the additional authentication information.

The third figure of FIG. 15 shows an example of receiving fingerprint information of the user as the additional authentication information. In this case, the user may input the fingerprint information to the additional authentication information input screen 1530, and the control unit 180 may match the input fingerprint information with prestored authentication information (fingerprint information). According to a result of the matching, the control unit 180 may allow the currently requested amount to be paid. When the payment is completed, the control unit 180 may display payment detail information 1540 as shown in the fourth figure of FIG. 15 on the display unit 251.

An example of inputting the fingerprint of the user as the requested additional authentication information has been described in FIG. 15. However, this is merely an embodiment of the present invention, and the present invention is not limited thereto. That is, the control unit 180 may request iris recognition information of the user, a predetermined character string, or a plurality of touch inputs forming a predetermined pattern as the additional authentication information in addition to the fingerprint information.

An example in which the immediate payment 1510 is selected from the limit excess notification information 1500 has been described in FIG. 15. However, it will be appreciated that the pending payment 1520 may be selected. FIG. 16 illustrates such a case.

For example, as shown in the second figure of FIG. 16, when the user selects the pending payment 1520 from the limit excess notification information 1500, the control unit 180 may suspend the payment of the currently requested amount until a predetermined condition is satisfied or the payment is selected by the user. Here, the predetermined condition may be associated with a position of the mobile terminal 200 (e.g., whether the mobile terminal 200 is location in a predetermined safe place) or associated with a current time (e.g., the current time is included in a predetermined specific time).

When the payment suspension is requested, the control unit 180 may add information regarding the purchase page 1420 from which the payment of the amount is currently requested to a predetermined payment suspension list including the items of which payments have been suspended. In this case, the control unit 180 may display information regarding the items of which payment suspensions have been requested. For example, as shown in the third figure of FIG. 16, the control unit 180 may display the information regarding the items of which payments have been suspended in the form of a separate graphic object displayed in the vicinity of the graphic object 1410 for displaying that the immediate payment is available.

The graphic object 1600 for displaying the items of which payments have been suspended may be displayed differently depending on the number of the items included in the payment suspension list. For example, when the number of items included in the payment suspension list is one, the graphic object 1600 may be formed to include one graphic sub-object, as shown in the third figure of FIG. 16. On the other hand, when the number of items included in the payment suspension list is two or more, the graphic object 1600 may be formed to include a plurality of graphic sub-objects corresponding to the items.

The control unit 180 may display the information regarding the items of which payment suspensions have been requested on the display unit 251 at any time upon the user's request. FIG. 17 shows such an example.

First, as shown in the first third figure of FIG. 17, the mobile terminal 200 according to an embodiment of the present invention may display the control unit 17 may display the graphic object 1600 for displaying the items of which payments have been suspended in the vicinity of the graphic object 1410 for displaying that the immediate payment is available. In this case, when the number of items of which payments have been suspended is two, the control unit 180 may display the graphic object 1600 for displaying the items of which payments have been suspended, which is formed to include two graphic sub-objects.

In this case, as shown in the first figure of FIG. 17, when a touch input is applied to a region of display unit 251 in which the graphic object 1410 for displaying that the immediate payment is available or the graphic object 1600 for displaying the items of which payments have been suspended is displayed, the control unit 180 may display information regarding items of which payment has been suspended so far, that is, information regarding items included in the payment suspension list on the display unit 215 in response to the applied touch input. The second figure of FIG. 17 shows such an example.

Referring to the second figure of FIG. 17, the information 1600 regarding the items currently included in the payment suspension list may include detailed information including a product image and a price of each item. In addition, each item may also include information corresponding to a purchase page of a corresponding product. Accordingly, when the user selects a specific item, the control unit 180 may also access a purchase page for the item to provide more detailed information to the user.

Furthermore, when the item of which payment suspension has been requested is selected through the payment interface corresponding to the careful purchase type of the user, as shown in the first figure of FIG. 8, the control unit 180 may display information regarding the number of products compared by the user. In this case, as shown in the second to fourth figures of FIG. 8, it will be appreciated that the control unit 180 may display information corresponding to each of the compared products on the display unit 251 according to the user's selection.

It will be appreciated that the information 1600 regarding the items included in the payment suspension list may further include graphic objects 1710 corresponding to a function of deleting the items. In this case, the control unit 180 may delete at least one of the items included in the payment suspension list on the basis of whether the user applies a touch input to a region of the display unit 251 in which the graphic objects 1710 corresponding to the deletion function are displayed. In this case, when at least one item is deleted, it will be appreciated that the graphic object 1600 for displaying the items of which payments have been suspended may be changed by reflecting the deletion. That is, when at least one item is deleted from the payment suspension list, the graphic object 1600, the graphic object 1600 may be changed to include one graphic sub-object by reflecting a current state of the payment suspension list in which only one item remains.

Figure 18:
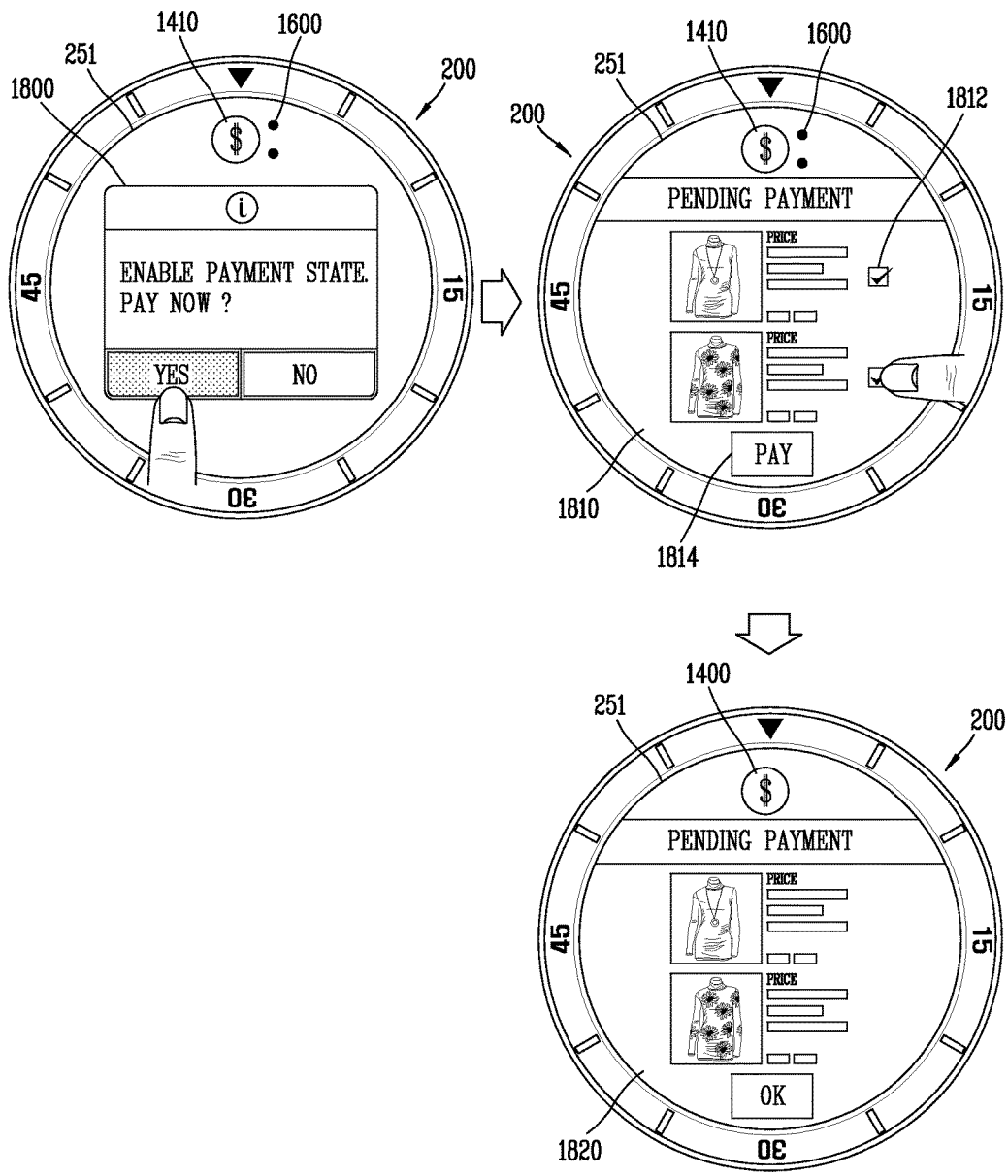

When a predetermined condition is satisfied, the control unit 180 may allow at least some of the suspended payment requests, that is, the items included in the payment suspension list to be paid at the same time. FIG. 18 shows an example in which one or more payment requests included in the payment suspension list are paid at the same time when the predetermined condition is satisfied. Here, the predetermined condition may be associated with the position of the mobile terminal 200 or the current time.

For example, the control unit 180 may measure a current position of the mobile terminal 200 and may determine that the payment for the suspended payment requests is available when the current position is a predetermined specific place. Here, the specific place may be a predetermined safe place, such as the user's house. The control unit 180 may determine whether the payment for the suspended payment requests is available on the basis of a result of measuring the current time. That is, when the measured current time is included in a specific time period, the control unit 180 may determine that the payment for the suspended payment requests is available.

When the predetermined condition is satisfied, the control unit 180 may display, on the display unit 251, notification information 1800 for notifying the user that the payment for the payment requests that have been suspended so far is available. As shown in the first figure of FIG. 18, the payment notification information 1800 may include information indicating that the payment is available in the current state and may further include a menu for receiving a selection of whether to make the payment from the user.

In this case, as shown in the first figure of FIG. 18, when the user selects the payment, the control unit 180 may display the information regarding the payment requests having been suspended so far on the display unit 251. For example, as shown in the second figure of FIG. 18, the control unit 180 may display information 1810 regarding the suspended payment requests in the form of an item included in the payment suspension list. In this case, the control unit 180 may further display a selection item 1812 corresponding to each of the suspended payment requests and may identify items selected by the user to be paid for through the selection item 1812.

When the user selects payment (pay 1814), the control unit 180 may allow the payment to be made for the items selected by the user. As shown in the third figure of FIG. 18, the control unit 180 may display information regarding paid items, that is, information regarding payment details on the display unit 251.

As shown in the second figure of FIG. 18, when the user selects all of the suspended payment requests, the control unit 180 may allow the payment for the selected payment requests to be made. In this case, since the payment for all of the items included in the payment suspension list may be made, the graphic object 1600 for displaying the items of which payments have been suspended may be no longer displayed. Accordingly, in consideration of this, as shown in the third figure of FIG. 18, only the graphic object 1410 for indicating that the immediate payment is available may be displayed on the display unit 251.

When the payment for the product purchased by the user is requested, it will be appreciated that the control unit 180 of the mobile terminal 200 according to an embodiment of the present invention may receive confirmation of the currently requested payment from the user on the basis of whether a predetermined condition is satisfied. The payment confirmation may be preformed when it is determined that the user have no time to consider whether to purchase the product. For example, the control unit 180 may determine that the user has just a little time to consider whether to purchase the product on the basis of the time at which the payment is requested and the position of the mobile terminal 200 while the payment is requested.

Figure 19:
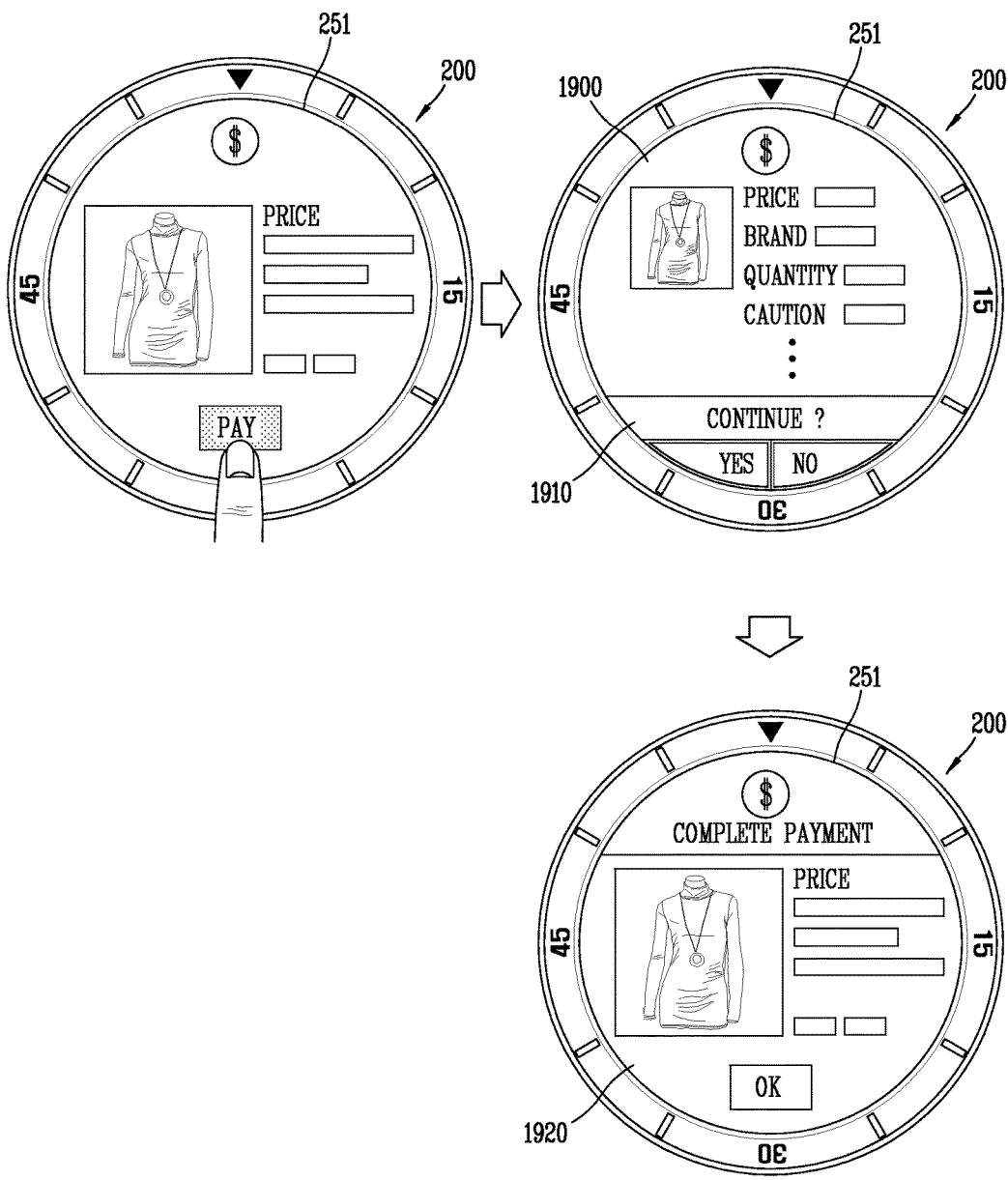
FIG. 19 is an exemplary diagram illustrating a process of receiving confirmation on requested payment when a predetermined condition is satisfied, in a mobile terminal according to an embodiment of the present invention.

As an example, when the payment request time is around an office-going time, such as 6 a.m. to 9 a.m. on weekdays, the control unit 180 may determine that the user does not sufficiently consider whether to purchase the product. Alternatively, when the mobile terminal 200 from which the payment is requested is moving or located outdoors or on a road, the control unit 180 may determine that the user has not sufficiently consider whether to purchase the product. In this case, the control unit 180 may request the user to confirm the currently requested payment. FIG. 19 shows an example in which a screen associated with the payment confirmation is displayed on the display unit 251 in the mobile terminal 200 according to an embodiment of the present invention.

First, as shown in the first figure of FIG. 19, when the payment for the specific product purchase is requested from the user, the control unit 180 may determine whether the confirmation on the currently requested payment is needed.

In this case, the control unit 180 may determine whether the confirmation is needed on the basis of the time at which the payment is requested and the position of the mobile terminal 200 while the payment is requested.

When a result of the determination is that the payment confirmation is needed, the control unit 180 may display the information 1900 for receiving confirmation on the currently requested payment from the user on the display unit 251. For example, the payment confirmation information may include detailed information regarding the product currently requested to be purchased. That is, the control unit 180 may display information about an image, a price, a manufacturer (or brand), and notes of the product currently requested to be purchased as the payment confirmation information 1900. Furthermore, it will be appreciated that the payment confirmation information 1900 may further include information regarding a purchase quantity, purchase option (e.g., delivery service cost option), or product quality, which is selected by the user.

The payment confirmation information 1900 may further include a menu 1910 for receiving a selection of whether to proceed with the payment process from the user. In this case, when the user select to proceed with the payment from the payment proceeding selection menu 1910, the control unit 180 may proceed with the payment of the amount currently requested by the product purchase of the user. When the payment is completed, the payment detail information 1920 may be displayed on the display unit 251, as shown in the third figure of FIG. 19. However, when the user selects to stop proceeding with the payment from the payment proceeding selection menu 1910, the control unit 180 may stop the payment process currently being performed and may cancel the product purchase.

Figure 20:
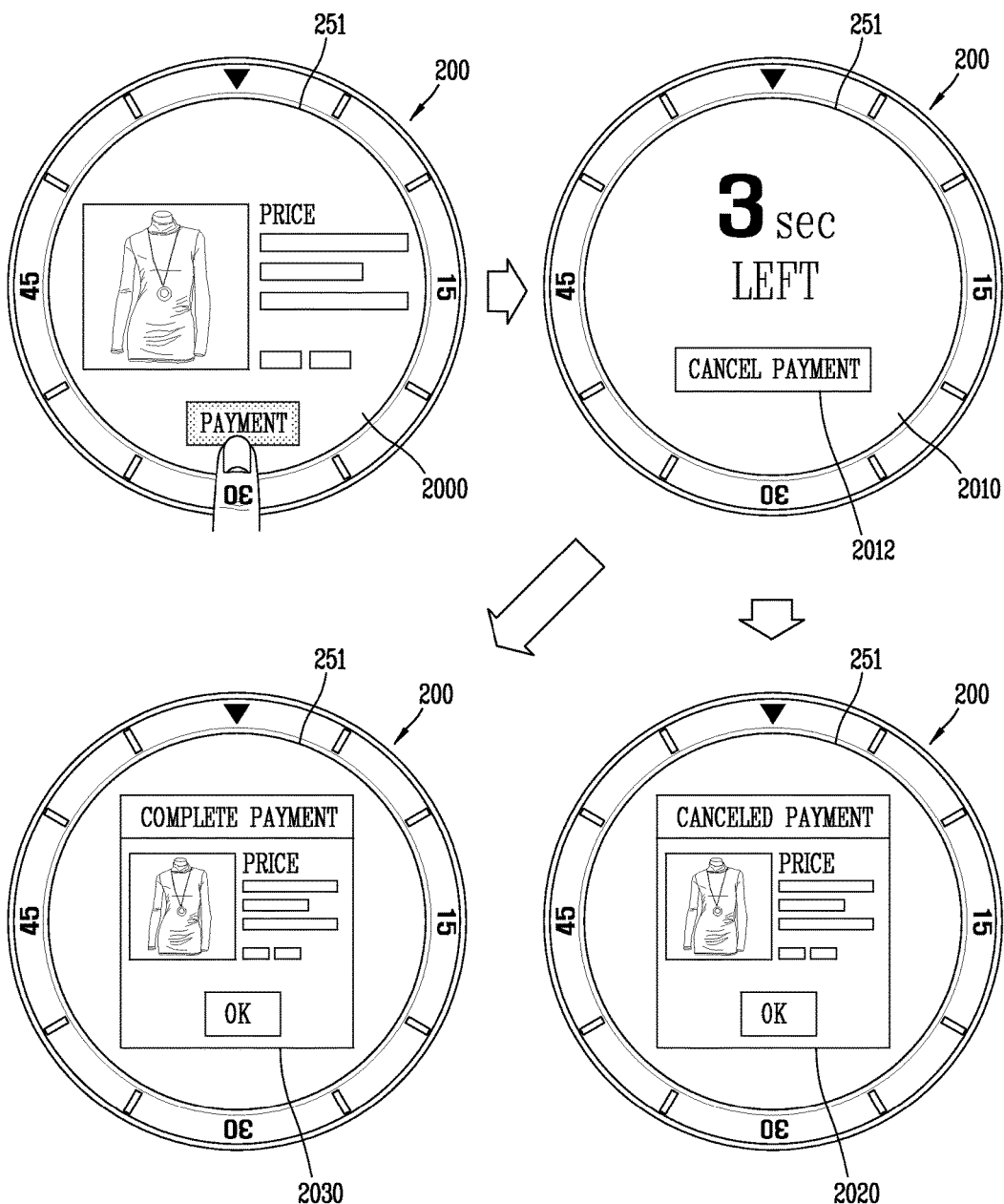
FIG. 20 is an exemplary diagram illustrating a process of paying for purchase of a product in a mobile terminal associated with the present invention.

When the payment process is in progress, the mobile terminal 200 according to an embodiment of the present invention may suspend the proceeding of the payment process for a predetermined time. This allows the user to cancel the payment when the payment is selected by an impulse purchase or by mistake. FIG. 20 is an exemplary diagram illustrating a process of paying for a purchased product in a mobile terminal according to an embodiment of the present invention.

Referring to FIG. 20, the first figure of FIG. 20 shows an example in which the payment is requested for a specific product purchase by the user. When the payment is requested as shown in the first figure of FIG. 20, the control unit 180 of the mobile terminal 200 according to an embodiment of the present invention may suspend the proceeding of the requested payment for a predetermined time. The second figure of FIG. 20 shows such an example.

In the state as shown in the second figure of FIG. 20, the control unit 180 may proceed with the payment process or cancel the requested payment depending on the user's selection. To this end, while the payment process is suspended, the control unit 180 may display screen information 2010 including a graphic object 201 for receiving a selection of cancellation of the requested payment from the user on the display unit 251. In this case, as shown in the second figure of FIG. 20, the screen information 2010 may display information regarding time that has elapsed after the payment is requested or the remaining time, which is a predetermined extension period minus the time that has elapsed so far.

The control unit 180 may proceed with or cancel the currently requested payment process on the basis of an input that the user applies through the graphic object 512 or in another way. For example, in the state as shown in the second figure of FIG. 20, when the user selects the graphic object 2012 corresponding to payment cancellation or selects the payment cancellation in a predetermined way, the control unit 180 may stop the currently suspended payment process and cancel the currently performed payment process and may display the payment cancellation on the display unit 251. The third figure of FIG. 20 shows an example in which information regarding payment cancellation details is displayed on the display unit 251.

In the state as shown in the second figure of FIG. 20, when the predetermined extension period has elapsed or the proceeding of the payment process is selected in a predetermined way while the user does not select the payment cancellation, the control unit 180 may proceed with the currently suspended payment process. In this case, the payment of the requested amount may be completed, and information regarding the payment completion details may be displayed. The fourth figure of FIG. 20 shows such an example.

Hereinafter, embodiments associated with a control method that can be implemented in the mobile terminal 200 having the foregoing configuration will be described with reference to the accompanying drawings. It is obvious to those skilled in the art that the present invention may be embodied in another specific form without departing from the spirit and scope of the present invention.

Figure 21:
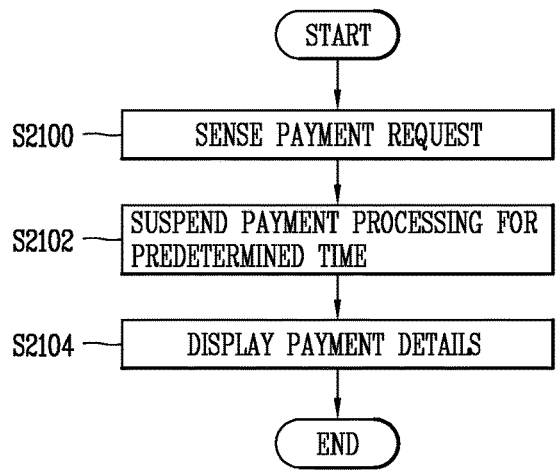
FIG. 21 shows a process that is performed during an extension period given upon completion of payment, in a mobile terminal associated with the present invention.

FIG. 21 shows a process in which payment for a purchase of a product is made in the mobile terminal 200 associated with the present invention.

Referring to FIG. 21, the control unit 180 of the mobile terminal 200 according to an embodiment of the present invention may sense whether payment for a product purchased by the user is requested (S2100). For example, when a function associated with a predetermined payment function is performed, the control unit 180 may determine that the payment is requested.

When the payment is requested in S2100, the control unit 180 may suspend the proceeding of the payment process during a predetermined extension period (S2102). The control unit 180 may determine whether cancellation of the currently requested payment is selected by the user during the extension period and may stop processing with the payment requested in S2100 when the payment cancellation is selected during the extension period.

On the other hand, when the payment cancellation is not selected during the extension period, the control unit 180 may proceed with the payment process suspended in S2102. In this case, the payment process requested in S2100 may be completed. When the payment process is completed, the control unit 180 may display information regarding the payment completion details on the display unit 251.

Thus, although the user purchases the product impulsively or by mistake, the mobile terminal 200 according to an embodiment of the present invention may allow the payment of the purchased product to be cancelled during the extension period. A process performed by the mobile terminal 200 during the extension period that is provided for the currently requested payment will be described in detail with reference to FIG. 22.

The control unit 180 may provide various functions to the user during the extension period. For example, the control unit 180 may allow the user to change a payment method or allow the user to select a way or place in which points generated by purchasing the product are accumulated during the extension period. Alternatively, the control unit 180 may allow the user to further purchase another product or allow the user to change user selection items (e.g., quantity, kind, color, etc.) that are set for the purchase of the product for payment is currently requested. Examples of various functions that may be provided during the extension period will be described in more detail with reference to FIGS. 27 and 28.

When the payment is cancelled or completed, the control unit 180 may display corresponding detail information on the display unit 251. In this case, the detail information may include a variety of information regarding the products for which payments are completed or cancelled. In addition, although the payment is completed as the extension period has elapsed or according to the user's selection, the control unit 180 may allow the detail information including a graphic object corresponding to the function of cancelling the currently completed payment when it is determined that there is a high possibility that the user has purchased the product impulsively or by mistake. This allows the user to easily cancel the purchase of the product purchased impulsively or by mistake although the payment is completed according to the user's selection or the elapse of the extension period. An example in which payment detail information including a graphic object associated with a payment cancellation function is displayed will be described in more detail with reference to FIGS. 29 and 30.

Figure 22:
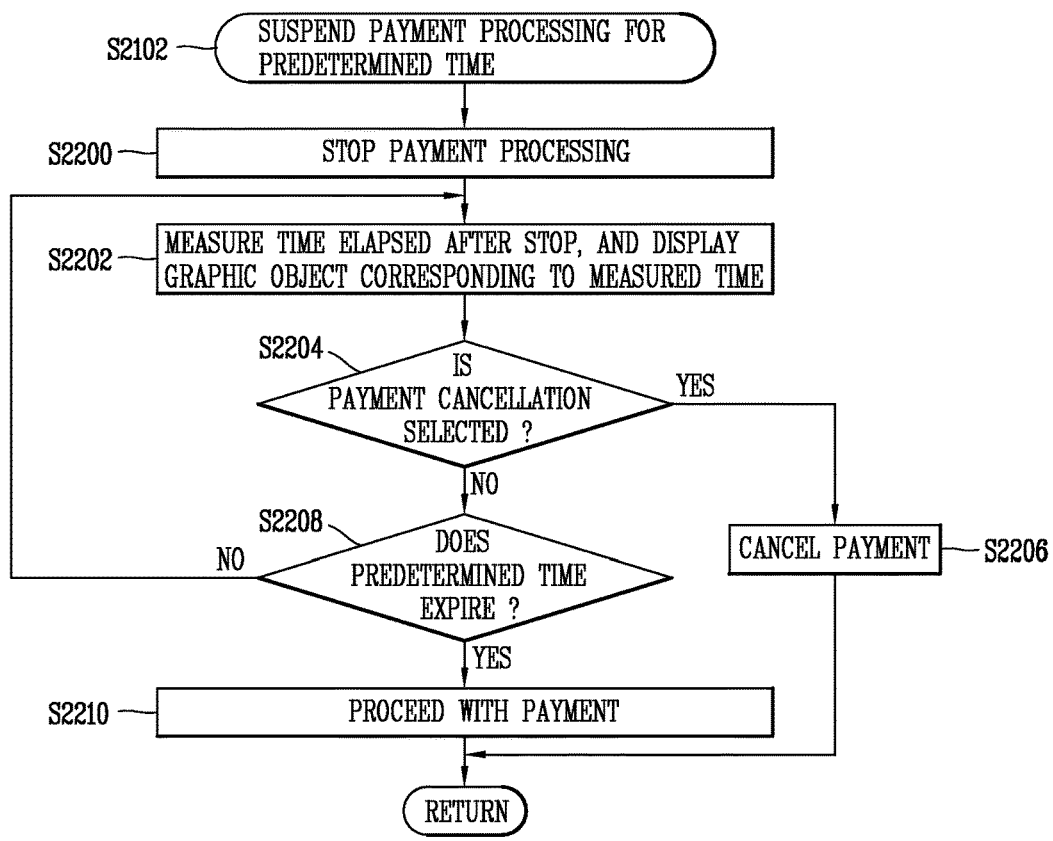
FIG. 22 shows a process of paying for a product purchase in a mobile terminal associated with the present invention.

FIG. 22 shows a process that is performed during an extension period given upon completion of payment, in a mobile terminal associated with the present invention.

Referring to FIG. 22, first, the control unit 180 of the mobile terminal 200 according to an embodiment of the present invention may temporarily stop proceeding with the payment process when the payment is requested in S2100 of FIG. 21 (S2200). The control unit 180 may measure a time that has elapsed after the payment process is stopped and may display a screen for displaying the measured time on the display unit 251 (S2202).

The screen may include a variety of information. For example, in S2202, a graphic object corresponding to the remaining time, which is a predetermined extension period minus the currently elapsed time, may be displayed on a screen displayed on the display unit 251. Here, the graphic object may be displayed such that its position or shape changes according to the remaining time. As an example, the graphic object may be displayed such that the graphic object moves along the outline of the display unit 251, and a moving velocity of the graphic object may be determined according to the predetermined time.

Furthermore, the graphic object may show the current remaining time using numbers or characters. In this case, the numbers or characters for showing the remaining time may be displayed in a region of the display unit 251 in which the graphic object is displayed, or in the vicinity of the graphic object. An example in which the graphic object for displaying the remaining time is displayed will be described in more detail with reference to FIGS. 23 to 26.

The control unit 180 may sense whether the payment cancellation is selected by the user (S2204). For example, when a predetermined key or the user's input is sensed, the control unit 180 may determine that that payment cancellation is selected. Here, the user's input corresponding to the payment cancellation may be the user's predetermined gesture or the user's voice input. As an example, when a user gesture for changing the direction faced by the display unit 251 to the opposite direction (e.g., flipping over a wrist with a watch-shaped mobile terminal 200) is sensed, the control unit 180 may determine that the currently sensed user gesture is intended to select the payment cancellation.

A user input corresponding to the payment cancellation may be the user's touch input that is applied to the graphic object currently displayed on the display unit 251. That is, when the user drags the graphic object in a specific direction or touches the graphic object for a predetermined time or more, the control unit 180 may determine this input as the user input corresponding to the payment cancellation. On the contrary, it will be appreciated that the control unit 180 may also determine the user's touch input as a user input for requesting that the payment process should proceed.

When a result of the determination in S2204 is that the user selects the payment cancellation, the control unit 180 may stop proceeding with the currently requested payment and may cancel the payment request (S2206). In this case, the currently requested payment may be cancelled. Thus, in S2104 of FIG. 21, information associated with the payment requested in S2100 may be displayed to be included in the payment cancellation details 2020 as shown in the third figure of FIG. 20.

On the other hand, when the payment cancellation is not selected in S2204, the control unit 180 may sense whether a predetermined time, that is, the extension period for the requested payment has expired (S2208). When a result of the sensing in S2208 is that the extension period has not expired yet, the processing proceeds back to S2202, and the control unit 180 may display information regarding the remaining time on the display unit 251 according to the elapsed time. The processing proceeds to S2204 and S2208, and the control unit 180 may determine whether the payment cancellation is selected during the extension period.

In S2208, when the predetermined extension period has expired, the control unit 180 may proceed with the payment process stopped in S2200 (S2210). Then, the payment process may proceed to complete the payment. When the payment is completed, its relevant information may be included in the payment details 2030 as shown in the fourth figure of FIG. 20 and displayed in S2104 of FIG. 21.

FIGS. 23 to 26 are exemplary diagrams illustrating various user interface screens for displaying an extension period given upon completion of payment, in the mobile terminal associated with the present invention.

Figure 23:
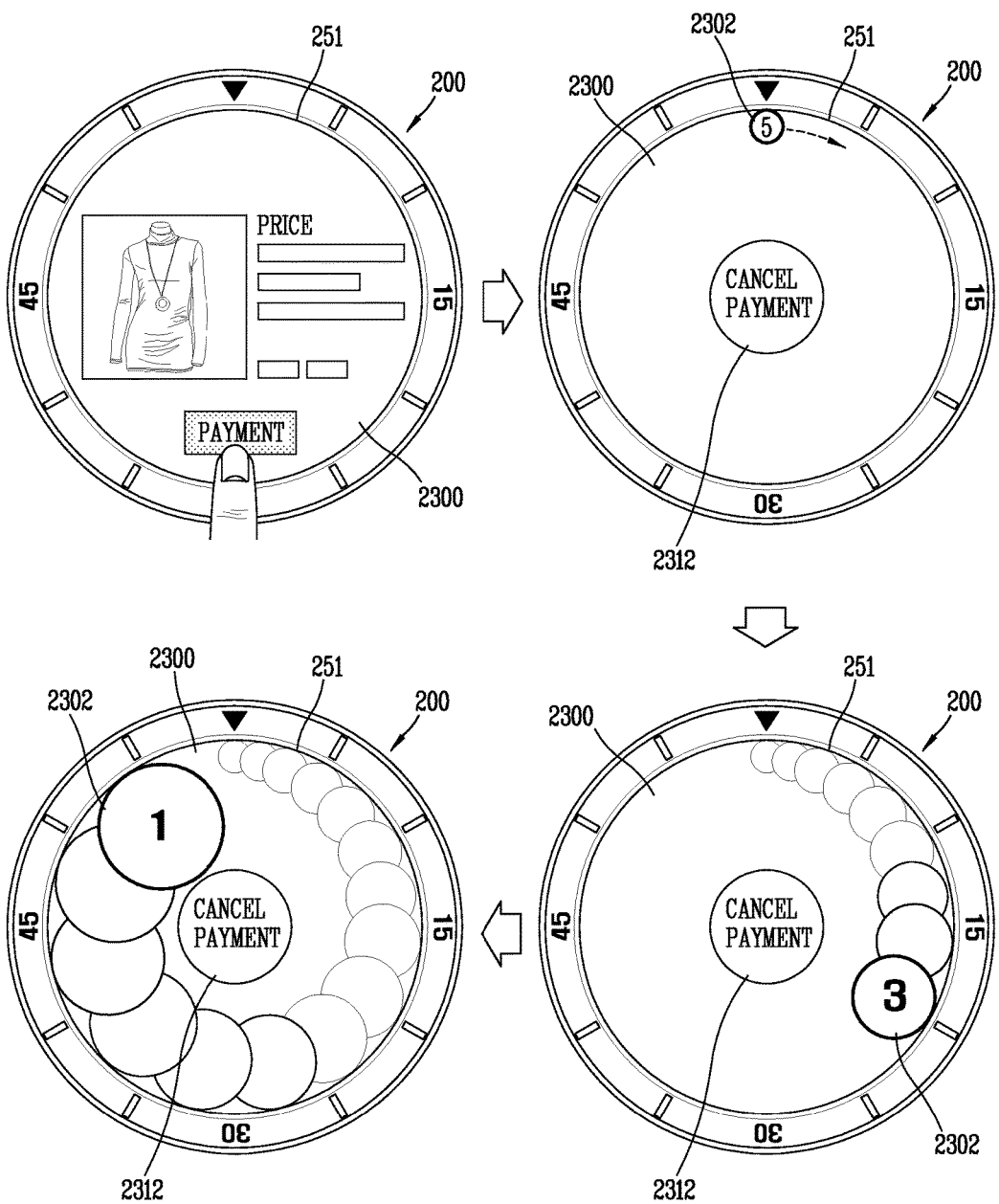
FIGS. 23 to 26 are exemplary diagrams illustrating various user interface screens for displaying an extension period given upon completion of payment, in the mobile terminal associated with the present invention.

First, referring to FIG. 23, the control unit 180 of the mobile terminal 200 according to an embodiment of the present invention may sense a payment request for a product purchased by the user. The first figure of FIG. 23 shows such an example.

The control unit 180 may stop processing with the currently requested payment during the predetermined extension period. The control unit 180 may perform time counting to display the remaining time out of the extension period using a graphic object with various shapes according to the currently elapsed time. For example, the control unit 180 may display the remaining time using the graphic object 2302 that moves along the outline of the display unit 251 at a certain velocity.

In this case, the control unit 180 may determine the moving velocity of the graphic object 2302 such that the graphic object 2302 rotates around the display unit 251 once before the extension period expires. That is, the control unit 180 may calculate an angular velocity with respect to the center of the display unit 251 with an elapse of the extension period and may determine the moving velocity of the graphic object 2302 on the basis of the calculated angular velocity. The second to fourth figures of FIG. 23 are exemplary diagrams showing an example in which a graphic object moves along the outline of the display unit 251 on the basis of the determine moving velocity.

As shown in the second to fourth figures of FIG. 23, the graphic object 2302 moves along the outline of the display unit 251 while rotating about the center of the display unit 251 as the remaining time deceases. In this case, when the graphic object 2302 returns to an initial position, the predetermined extension period expires, and thus the payment process may proceed.

In addition, the graphic object may change in size or shape with an elapse of time. As shown in the second to fourth figures of FIG. 23, as the remaining time decreases, the size of the graphic object 2302 may increase gradually. Although not shown, it will be appreciated that the graphic object 2302 may changes in shape as well as size.

The control unit 180 may determine whether the payment is cancelled on the basis of a user input to the graphic object 2312. For example, the control unit 180 may move the graphic object 2302 on the basis of a touch input that the user applies to a region of the display unit 251 in which the graphic object 2302 is displayed and a drag input that the user applies after the touch input. The control unit 180 may determine whether the payment is cancelled on the basis of the position of the moved graphic object 2302.

As an example, when the graphic object 2302 is moved to a specific position of the display unit 251 according to the drag input, the control unit 180 may determine that cancellation of the temporarily stopped payment is selected. As shown in the second to fourth figures of FIG. 23, when a touch and drag input is applied to position the graphic object 2312 into a payment cancellation region (Cancel payment) 2312 disposed at the center of the display unit 251, the control unit 180 may determine the touch and drag input as the user input for the payment cancellation.

It will be appreciated that the control unit 180 may determine the remaining time on the basis of the touch and drag input applied to the graphic object 2302. When the graphic object 2302 is moved to a specific point of the display unit 251, the control unit 180 may determine the remaining time on the basis of the position of the graphic object 2302 and may perform time counting on the basis of the determined remaining time. For example, in the state as shown in the second figure of FIG. 23, when the user touches the graphic object 2302 and then drags the graphic object 2302 to the position of the graphic object 2032 of the fourth figure of FIG. 23, the control unit 180 may determine the remaining time as 1 second on the basis of the dragged position of the graphic object 2302 and may perform time counting according to the remaining time determined on the basis of the position. That is, the control unit 180 may change the remaining time on the basis of the touch and drag input that the user applies to the graphic object 2302.

Accordingly, when the graphic object 2302 is positioned in front of the current position of the graphic object 2302 in a direction in which the graphic object 2302 moves, the remaining time may further decrease. In this case, when the graphic object 2302 rotates about the center of the display unit 251 one time according to the touch and drag input, the control unit 180 may consider that the user input is intended to exhaust all the remaining time out of the predetermined extension period. Thus, the control unit 180 may directly proceed with the currently stopped payment process.

On the contrary, when the graphic object 2302 is positioned behind the current position of the graphic object 2302 in a direction in which the graphic object 2302 moves, the remaining time may further increase. That is, when the graphic object 2302 is moved from the position of the graphic object 2302 shown in the fourth figure of FIG. 23 to the position of the graphic object 2302 shown in the second figure of FIG. 23, the control unit 180 may reset the remaining time to 5 seconds according to the movement of the graphic object 2302 and may perform time counting on the reset remaining time.

It will be appreciated that the temporarily stopped payment process may directly proceed in a method other than the touch and drag input. For example, the control unit 180 may set a specific region of the display unit 251 as a region for directly proceeding with the temporarily stopped payment. In this case, when the position of the graphic object 2302 moved according to the touch and drag input is included in the predetermined proceeding region, it will be appreciated that the control unit 180 may directly proceed with the temporarily stopped payment.

A region for directly receiving a selection of cancellation of the payment process currently being performed may be previously determined on the display unit 215. In this case, the region for receiving a selection of the cancellation of the payment process may be distinct from other regions of the display unit 251 by using a separate graphic object. For example, the predetermined region may be the payment cancellation region 2312. In this case, when there is a user input (e.g., a touch input) applied to the payment cancellation region 2312, the control unit 180 may determine that the cancellation of the payment is selected.

The payment cancellation region 2312 may be displayed in various forms. As shown in the second to fourth figures of FIG. 23, the control unit 180 may display a region determined as the payment cancellation region 2312 through at least one character or graphic object. However, it will be appreciated that the control unit 180 may display information regarding the remaining time calculated by the time counting up to the current.

Figure 24:
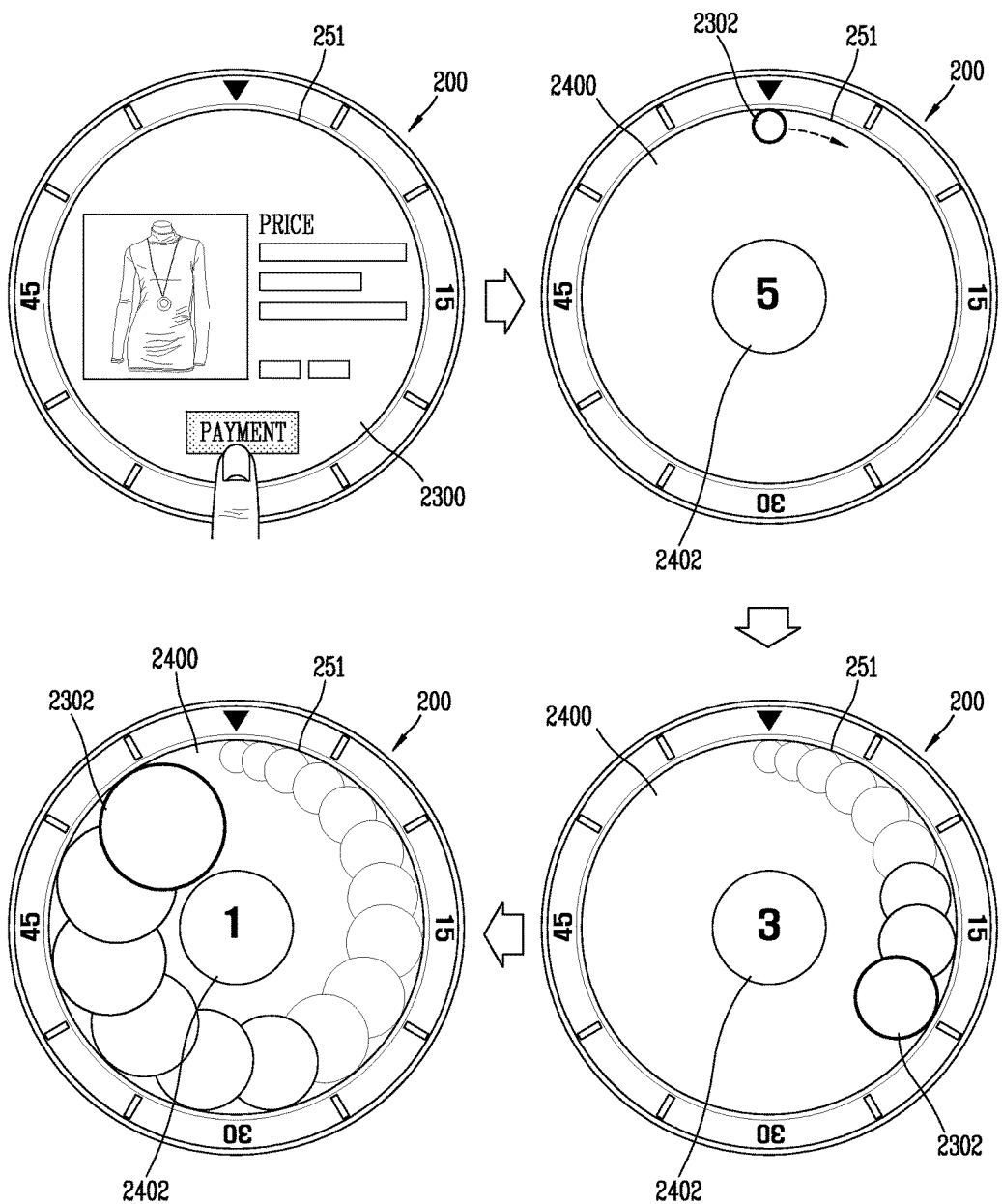

FIG. 24 shows such an example.

Referring to FIG. 24, as shown in the second to fourth figures of FIG. 24, the information regarding the remaining time that is currently counted may be displayed in the payment cancellation region 2312. In this case, as shown in the second to fourth figures of FIG. 24, it will be appreciated that information regarding the counted time may not be displayed in the graphic object 2302.

As described with reference to FIG. 23, the position of the graphic object 2302 may be changed according to the touch and drag input of the user. When the position of the graphic object 2302 is changed, the remaining time corresponding to the changed position may be reset. The reset remaining time may be displayed in one region of the display unit 251 in which the payment cancellation region 2312 is displayed.

Figure 25:
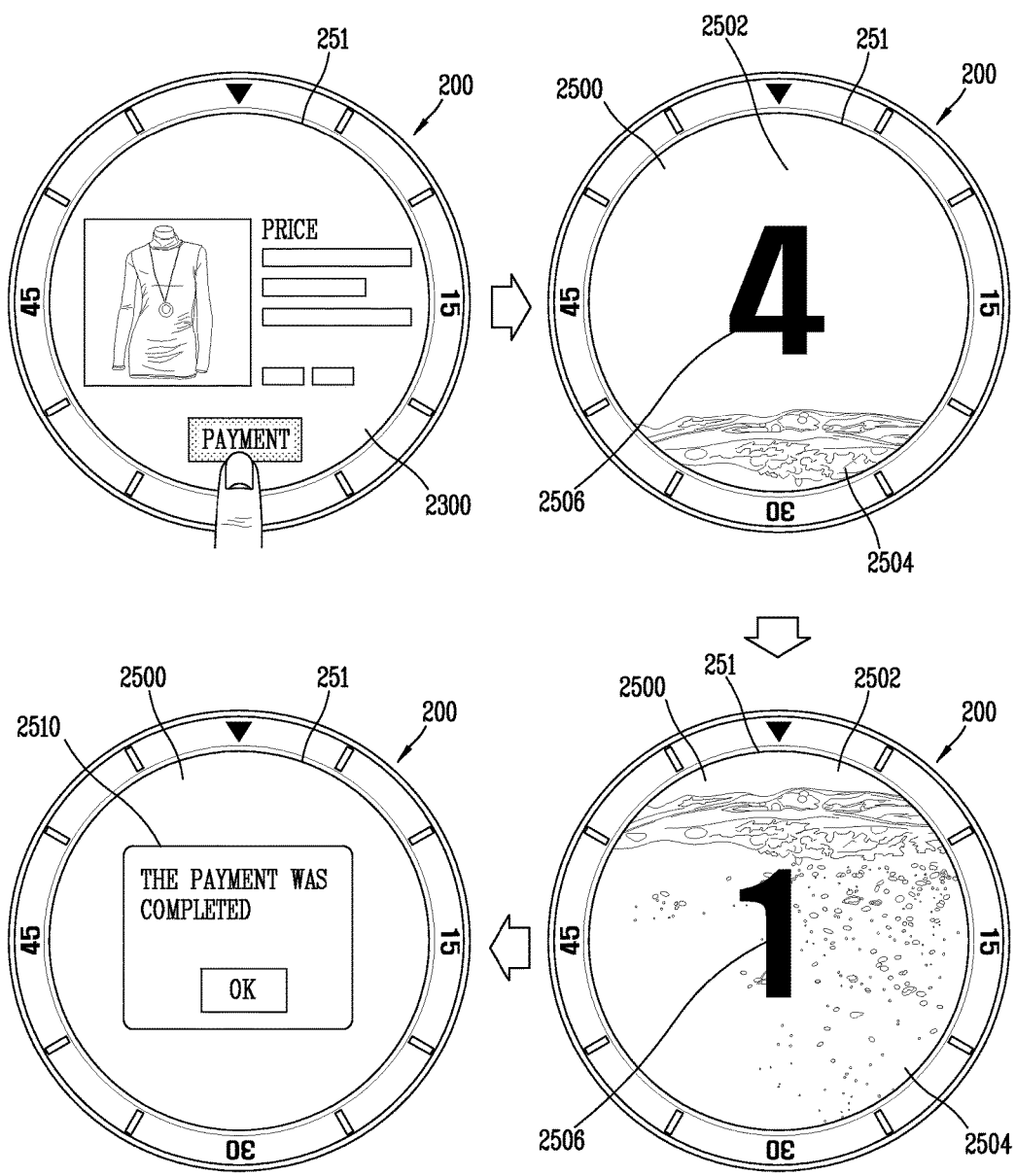
Figure 26:
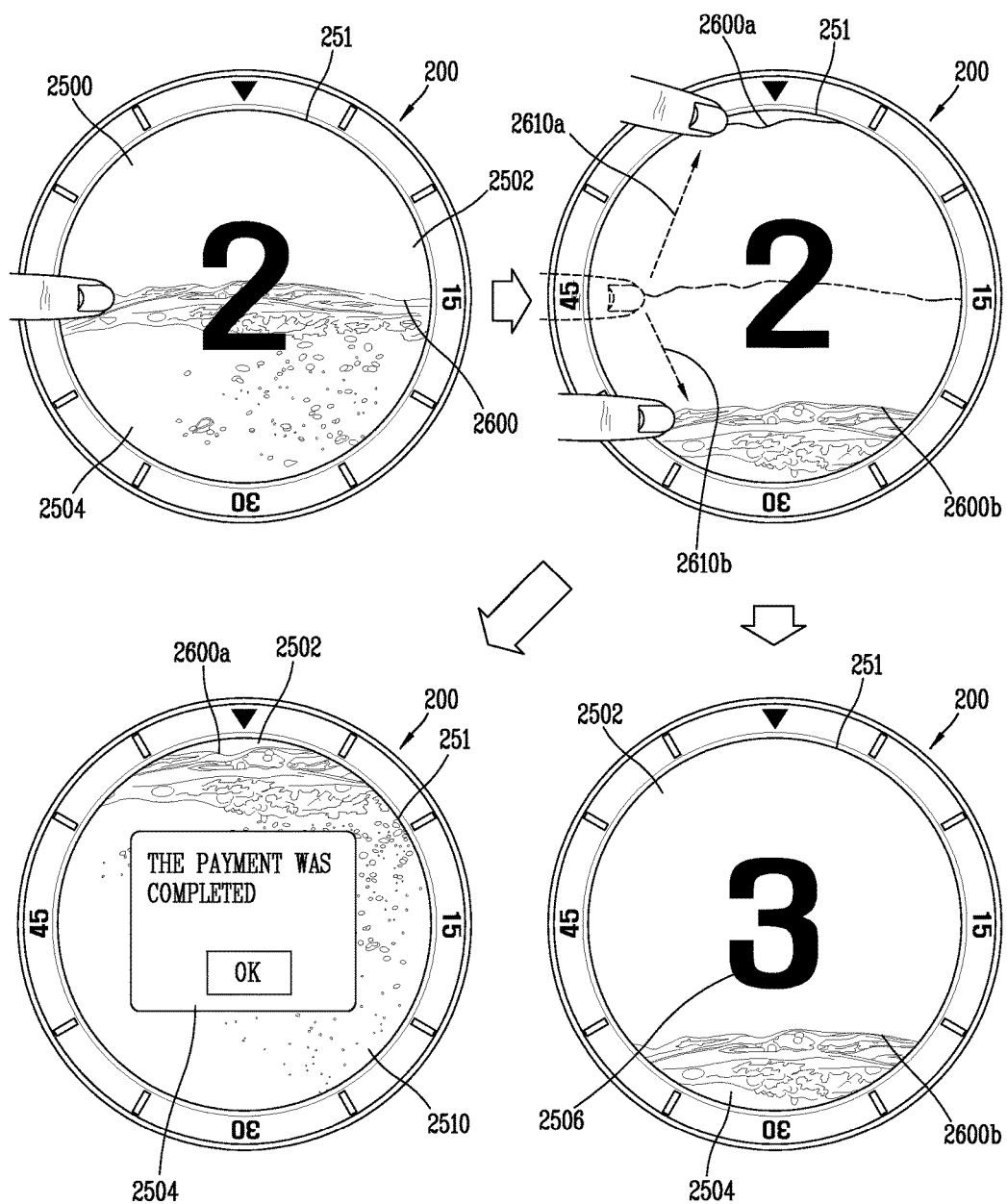

An example in which the remaining time, which is the predetermined extension period minus the currently elapsed time, is displayed using the graphic object 2302 that moves along the outline of the display unit 251 has been described in FIGS. 23 and 24. However, it will be appreciated that the remaining time may be displayed in another method. FIGS. 25 and 26 show such an example.

First, referring to FIG. 25, the first figure of FIG. 25 shows an example in which the payment request for the product purchase is selected. As shown in the first figure of FIG. 25, when the payment is requested, the control unit 180 may stop proceeding with the requested payment during the predetermined extension period. The control unit 180 may start time counting and calculate the remaining time according to the counted time.

Then, the control unit 180 may display a screen including different information depending on the calculated remaining time on the display unit 251. For example, the control unit 180 may divide the display unit 251 into a plurality of regions according to a ratio of the calculated remaining time to the counted time.

That is, when the extension period is 5 seconds, and the time counted after the payment is stopped at the same time the payment is requested is 1 second, the remaining time may be calculated as 4 seconds. In this case, the control unit 180 may calculate the ratio of the remaining time to the counted time as 4:1. The display unit 180 may divide the display unit 251 into two regions having a size ratio of 4:1.

The second figure of FIG. 25 shows such an example. That is, as shown in the second figure of FIG. 25, the control unit 180 may display screen information 2500 including a first region 2502 corresponding to the remaining time and a second region 2504 corresponding to the counted time on the display unit 251. In this case, in order to display the first region 2502 and the second region 2504, which are distinct from each other, the control unit 180 may display a graphic object corresponding to the size of the first region 2502 or second region 2504 in the first region 2502 or second region 2504. In this case, the control unit 180 may use a graphic object that symbolizes flowing liquid to show that water is pouring in with the elapse of time. The second figure of FIG. 25 shows such an example. The graphic object 2506 for displaying the remaining time may be further included in the screen information 2500.

The control unit 180 may change sizes of the first region 2502 and the second region 2504 according to the counted time. That is, the counted time may increase with the elapse of time, and the remaining time may decrease in proportion to this increase. For example, when a ratio of the remaining time to the counted time is opposite to that shown in the second figure of FIG. 25, that is, the predetermined extension period is 5 seconds and the counted time is 4 seconds, the remaining time may be calculated as 1 second, and the ratio of the remaining time to the counted time may be 1:4.

In this case, the control unit 180 may display the screen information 2500 divided into regions having different sizes according to the changed ratio of the remaining time to the counted time on the display unit 251. That is, as shown in the third figure of FIG. 25, the screen information 2500 divided into the first region 2502 and the second region 2504 having a size ratio of 1:4 may be displayed according to the current ratio of the remaining time to the counted time. The remaining time calculated on the basis of the counted time may be more accurately displayed in the form of numbers or characters through a separate graphic object 2506.

On the other hand, when the predetermined extension period has elapsed to exhaust all the remaining time, that is, when the calculated remaining time is 0, the control unit 180 may proceed with the stopped payment process. When the payment for the product purchase is completed, as shown in the fourth figure of FIG. 25, the control unit 180 may display the screen information indicating that the payment has been completed on the display unit 251. The control unit 180 may display information regarding the successfully purchased product on the display unit 251 as information regarding payment completion details according to the user's selection or automatically.

Although the remaining time is displayed as shown in FIG. 25, it will be appreciated that the counted time and the remaining time may be set arbitrarily according to the user's selection. That is, the control unit 180 may set the remaining time on the basis of the touch and drag input that the user applies to a point of the display unit 251. FIG. 26 shows such an example.

First, the first figure of FIG. 26 shows an example in which the user's touch and drag input is received when the screen information 2500 divided into different regions depending on the ratio of the remaining time to the counted time is displayed on the display unit 251 in order to display the remaining time, as shown in FIG. 25. In this case, as shown in the first figure of FIG. 26, when the user's touch input is applied to one point of the display unit 251 corresponding to a boundary 2600 between the two divided regions, the control unit 180 may determine that the touch input is intended to set the remaining time at user's discretion.

Then, the control unit 180 may set the remaining time on the basis of a drag input applied after the touch input. As shown in the second figure of FIG. 26, when the user applies a drag input in a direction 2610b of decreasing the remaining time or in a direction 2610a of increasing the remaining time while applying a touch input to the boundary 2600 between the two divided region, the position of the boundary 2600 between the two divided regions may be changed according to the applied drag input. Accordingly, when the drag input is applied in the direction 2610a of decreasing the remaining time, the position of the boundary 2600 between the two regions may be changed to a first position 2600a. When the drag input is applied in the direction 2610b of increasing the remaining time, the position of the boundary 2600 between the two regions may be changed to a second position 2600b. The control unit 180 may determine the remaining time on the basis of the changed position 2600a or 2600b of the boundary 2600 between the two divided regions.

Thus, as shown in the third figure of FIG. 26, when the boundary 2600 between the two divided regions is moved to the second position 2600b, the sizes of the two regions divided by the moved boundary, that is, the first region 2502 and the second region 2504 may be determined. The remaining time and the currently counted time may be determined according to the determined sizes of the first region 2502 and the second region 2504, and the remaining time determined according to the drag input may be displayed with the graphic object 2506. When it is sensed that the drag input is completed, that is, a touch input unit such as the user's finger or a touch pen is spaced a certain distance or more from the display unit 251, the control unit 180 may restart counting from the currently determined counted time or remaining time.

When the size of the first region 2502 divided by the moved boundary is less than a predetermined size, the control unit 180 may determine that the user selects the payment proceeding. That is, as shown in the fourth figure of FIG. 26, when the boundary 2600 between the two divided regions is moved to the first position 2600a, the size of the first region 2502 may decrease to below the predetermined size. Then, the control unit 180 may directly proceed with the currently stopped payment process. As shown in the fourth figure of FIG. 26, the control unit 180 may display the screen information 2510 indicating that the payment is completed on the display unit 251. The control unit 180 may display information regarding the successfully purchased product on the display unit 251 as information regarding payment completion details according to the user's selection or automatically.

Figure 27:
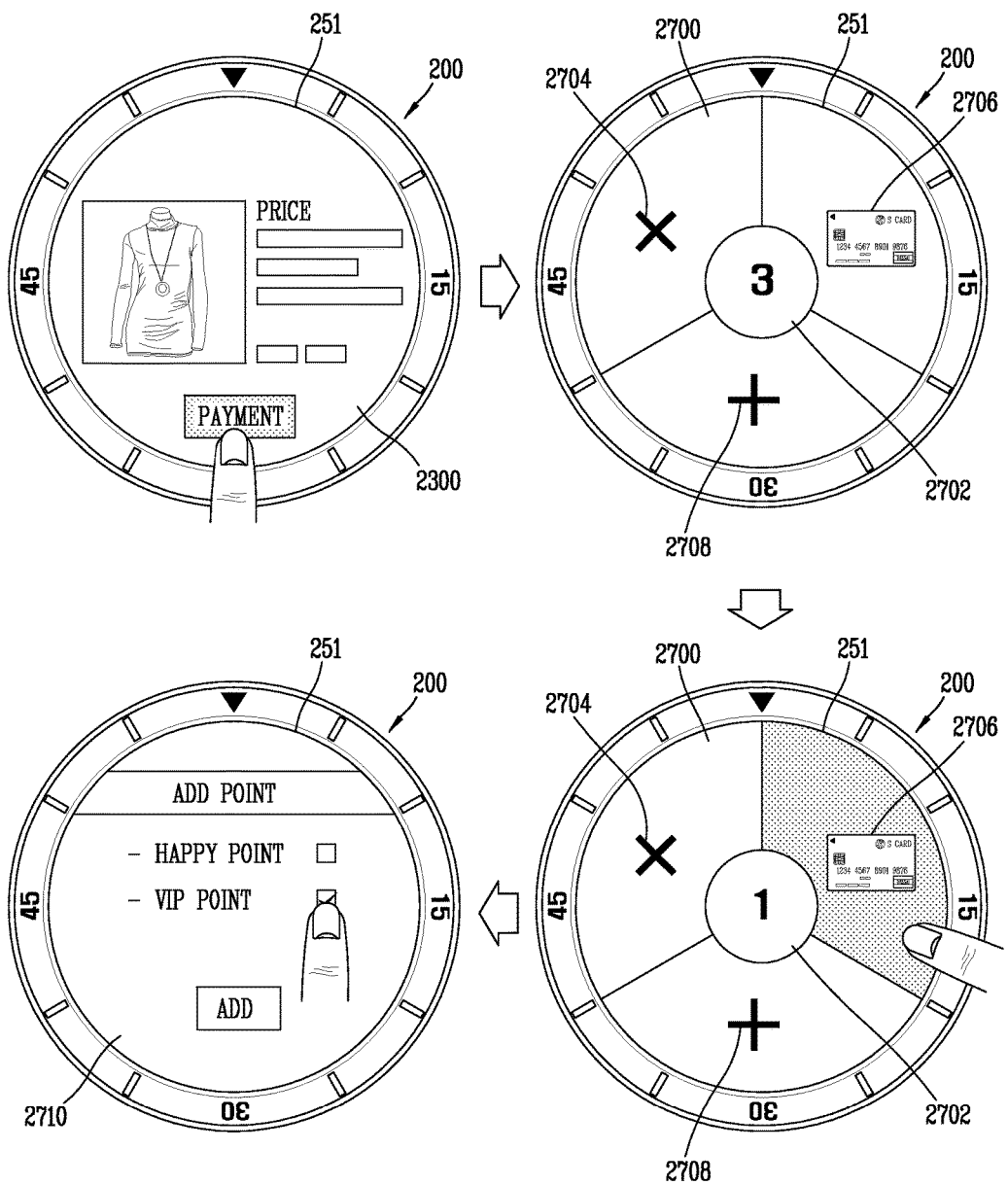
FIG. 27 shows an example in which graphic objects associated with different functions are displayed during an extension period given upon completion of payment, in a mobile terminal associated with the present invention.
Figure 28:
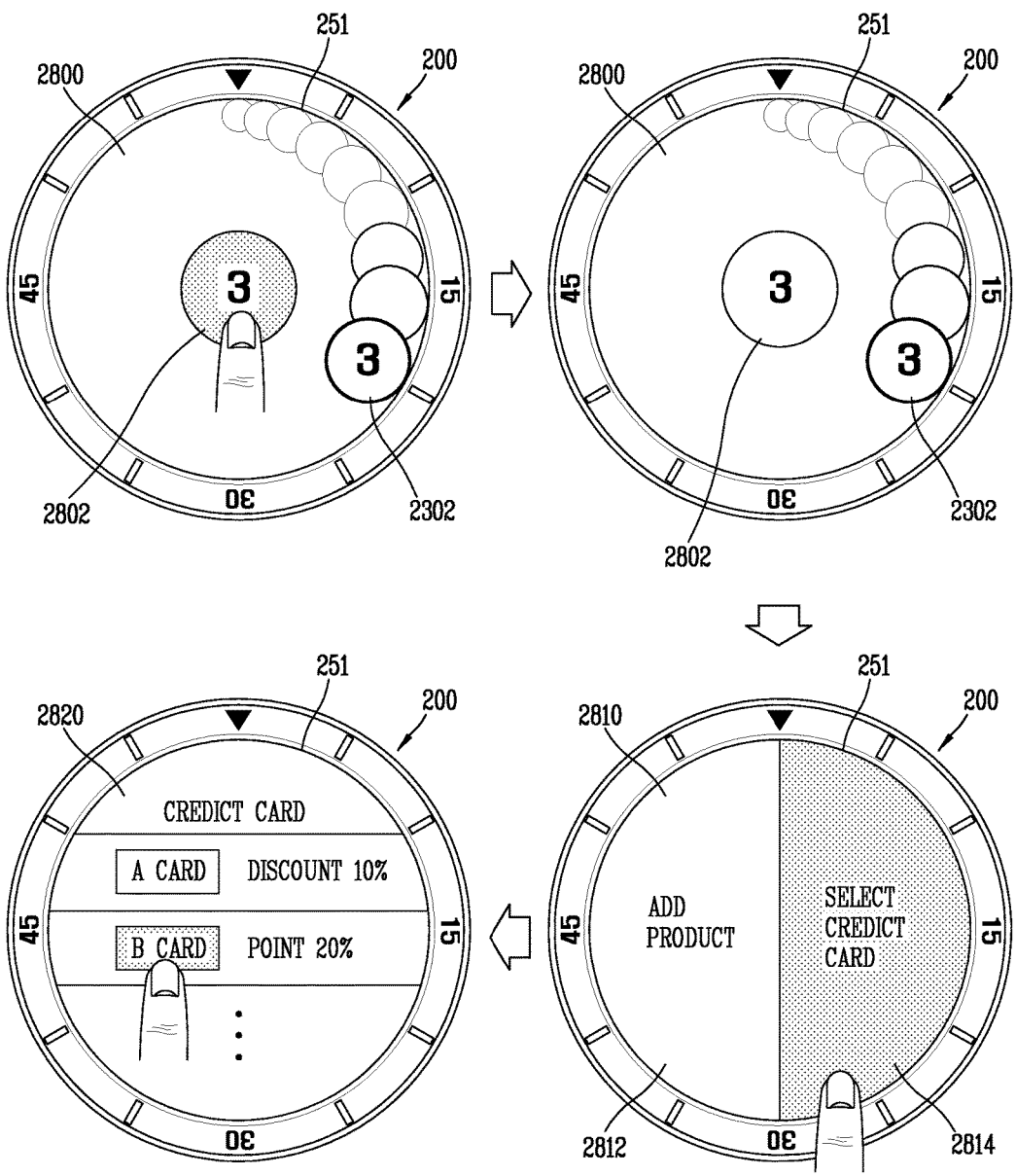
FIG. 28 is an exemplary diagram illustrating an example in which an extension period is paused depending on a user selection, in a mobile terminal associated with the present invention.

As described above, the mobile terminal 200 according to an embodiment of the present invention may provide various functions to the user during the extension period. FIGS. 27 and 28 illustrate examples of the functions that may be provided during the extension period by the mobile terminal 200 according to an embodiment of the present invention.

First, FIG. 27 shows an example in which graphic objects associated with different functions are displayed during the extension period provided upon completion of payment, in a mobile terminal associated with the present invention.

Referring to FIG. 27, the first figure of FIG. 27 shows an example in which the payment request for the product purchase is selected. In this case, the control unit may temporarily stop proceeding with the requested payment during a predetermined extension period and may provide various functions associated with the product purchase to the user during the extension period.

For example, the function associated with the product purchase is a function of changing the currently set payment method, but may be a function of managing points accompanied by the product purchase or a function of further purchasing an additional product. In this case, the control unit 180 may further display the information regarding the functions associated with the product purchase on the display unit 251 on which the screen information regarding the extension period is displayed. The second figure of FIG. 27 shows such an example.

The second figure of FIG. 27 shows an example in which the display unit 251 is divided into a plurality of different regions, in which different graphic objects are displayed. For example, such graphic objects may include a graphic object 2702 for indicating the remaining time and graphic objects 2704, 2706, and 2708 corresponding to the functions associated with the product purchase. Here, assuming that the functions associated with the product purchase include the change of a payment method (first function), the management of accumulated points (second function), and purchase of additional products (third function), the first, second, and third graphic objects 2704, 2706, and 2708 may correspond to the first, second, and third functions, respectively.

In this state, the control unit 180 may sense whether a user input is applied to any one of the graphic objects 2704, 2706, and 2708. For example, as shown in the third figure of FIG. 27, when the user applies a touch input to a distinct region of the display unit 251, in which the second graphic object 2706 is displayed, the control unit 2706 may display the screen information regarding the second function corresponding to the second graphic object 2706, that is, the function of managing the accumulated points on the display unit 251, as shown in the fourth figure of FIG. 27.

As shown in FIG. 27, when the screen information 2710 regarding a specific function that may be provided during the extension period is displayed on the display unit 251, the control unit 180 may temporarily stop time counting. This is intended to prevent the payment from proceeding to be completed while the specific function associated with the product purchase is executed. In this case, when the execution of the function selected during the extension period is completed, the control unit 180 may proceed with the time counting. For example, when information regarding the remaining time is displayed on the display unit 251 according to the user's manipulation (e.g., see the second figure of FIG. 27) while the screen associated with the execution of the specific function is displayed as shown in the fourth figure of FIG. 27, the control unit 180 may determine that the execution of the specific function is completed.

An example in which the time counting is temporarily stopped when the user selects the execution of the specific function during the extension period has been described in FIG. 27. However, it will be appreciated that the time counting may be temporarily stopped first according to the user's selection. In this case, while the time counting is stopped, the control unit 180 may provide various functions associated with the product purchase during the extension period. FIG. 28 shows such an example.

First, the first figure of FIG. 28 shows an example in which the requested payment is temporarily stopped at the same time as the payment request and the remaining time out of the predetermined extension period is displayed through the graphic object 2302 according to the time that has elapsed after the temporary stop of the payment. In this case, the screen information 2800 displayed on the display unit 251 may further include a graphic object 2802 that indicates the remaining time using at least one character or number.

In this case, the control unit 180 may stop time counting on the basis of the user input. For example, the user input may be a touch input that the user applies to the graphic object 2802 that indicates the remaining time using the character or number or the graphic object 2302 that changes in at least one of a position, size, and shape depending on the remaining time. As shown in the first figure of FIG. 28, when the user applies a touch input to the graphic object 2802 or a region of the display unit 251, in which the graphic object 2302 is displayed, the control unit 180 may stop time counting currently being performed in response to the user's touch input. In this case, the information regarding the remaining time that is calculated when the touch input is applied may be displayed through the graphic objects 602 and 1102 on the display unit 251.

In this state, the control unit 180 may receive a selection of at least one predetermined function from the user. In the state shown in the second figure of FIG. 28, when a specific key or voice signal is input, or when the user's specific gesture is sensed, the control unit 180 may display a menu screen 2810 for receiving a selection of any one of a plurality of different functions on the display unit 251, as shown in the third figure of FIG. 28. Here, the functions selectable through the menu screen 2810 may include at least two of the functions that may be provided during the predetermined extension period, that is, functions of changing the payment method, purchasing additional products, and managing accumulated points.

Accordingly, as shown in the third figure of FIG. 28, the control unit 180 may divide the region of the display unit 251 into a plurality of regions according to the number of provided functions and then may display the menu screen 2810. In this case, the control unit 180 may execute a function corresponding to any one region selected by the user between the divided regions 2812 and 2814 and may display screen information regarding the executed function on the display unit 251. As shown in the third figure of FIG. 28, when the region (select credit card) 2814 corresponding to the function of changing the payment method is selected by the user, the control unit 180 may display information 2820 regarding the currently set payment methods on the display unit 251. The payment method may be changed according to the user's selection.

Although not shown, when the time counting is stopped as shown in FIGS. 27 and 28, it will be appreciated that the control unit 180 of the mobile terminal 200 according to an embodiment of the present invention may display information regarding the purchased product on the display unit 251 according to the user's selection. This may allow the user to check information regarding a product currently being purchased in more detail during the extension period.

Figure 29:
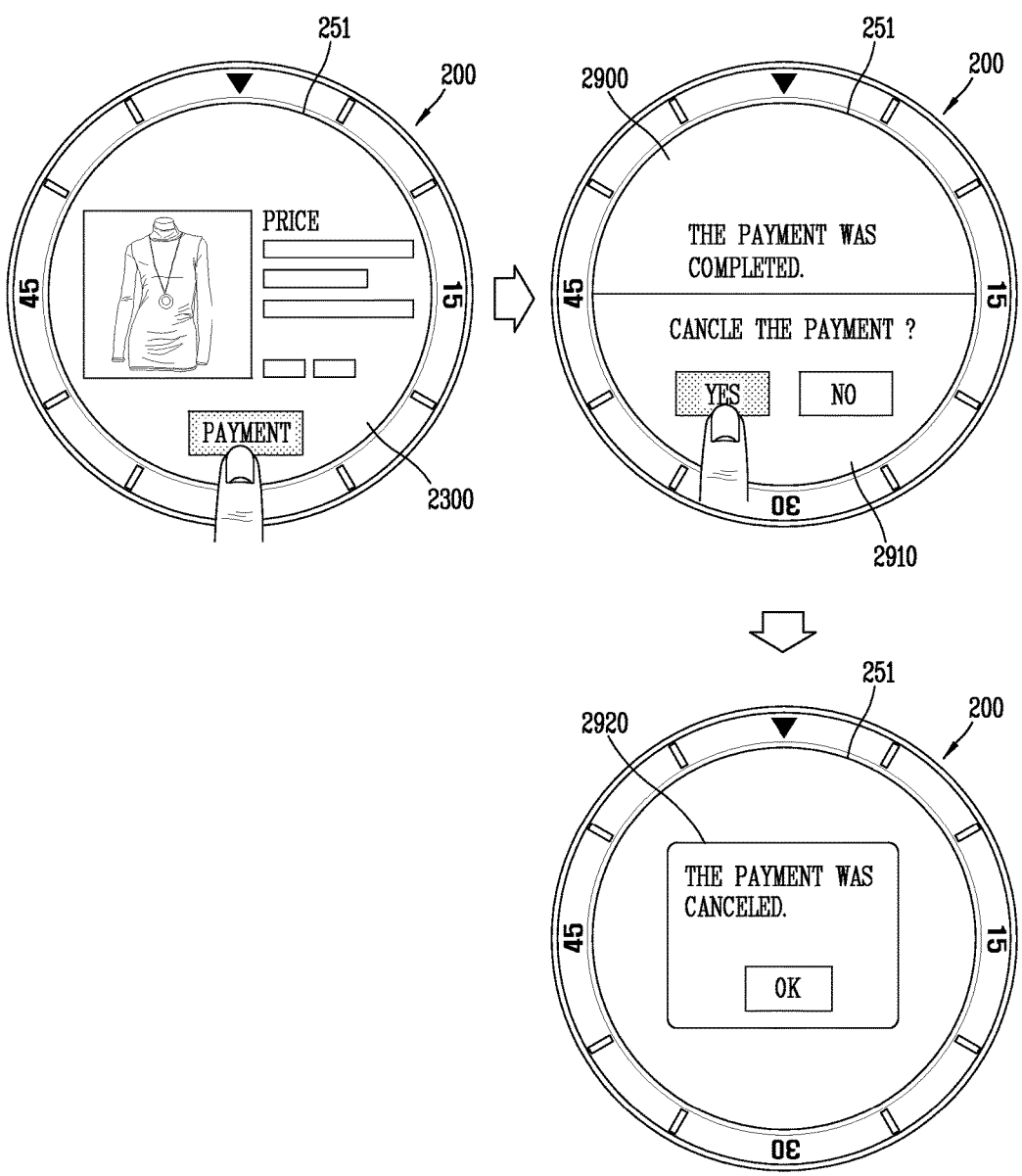
FIG. 29 is an exemplary diagram illustrating an example in which payment detail information including a payment cancellation function is displayed in the mobile terminal associated with the present invention.
Figure 30:
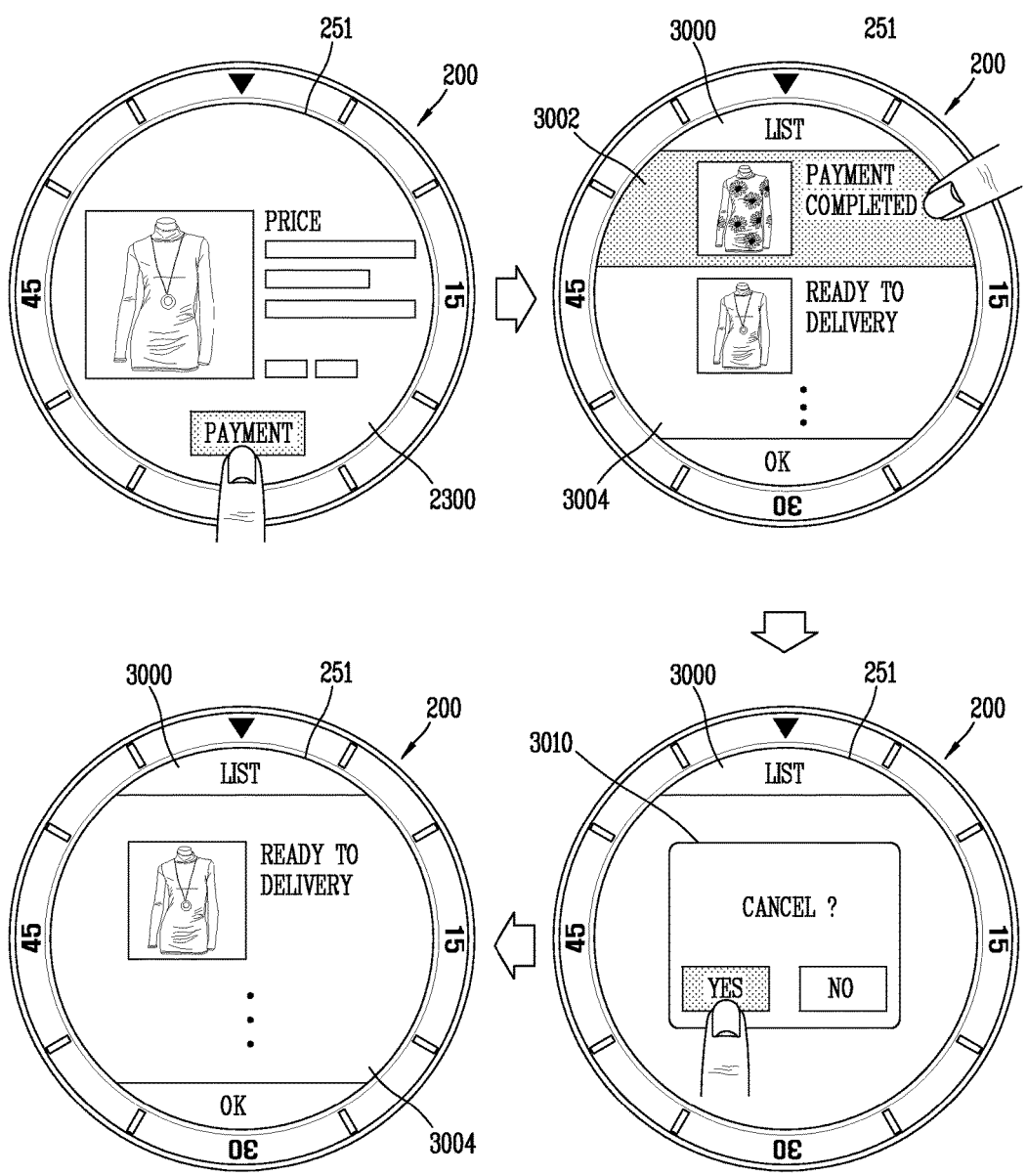
FIG. 30 is an exemplary diagram illustrating an example in which payment detail information for cancelling an item that has been completely paid for is displayed upon completion of payment, in a mobile terminal associated with the present invention.

As described above, although the payment is instantly completed as the extension period has elapsed or according to the user's selection, the mobile terminal 200 according to an embodiment of the present invention may provide the function of more easily cancelling the completed payment when it is determined that there is a high possibility that the user has purchased the product impulsively or by mistake. For example, the control unit 180 may enable the completed payment to be more easily cancelled by including an item for finally approving the completed payment upon the completion of the payment in the payment detail information. FIGS. 29 and 30 illustrate examples in which payment detail information is displayed in a mobile terminal according to an embodiment of the present invention.

First, referring to FIG. 29, the first figure of FIG. 29 shows an example in which payment request for product purchase is selected. When the payment request is sensed, the control unit 180 may suspend proceeding with the requested payment during a predetermined extension period and may also cancel the payment on the basis of a user input applied during the predetermined extension period.

When the payment is not cancelled during the predetermined extension period or when the user proceeds with the payment process, the control unit 180 may complete the payment. In this case, the control unit 180 may display payment detail information 2900 further including a menu screen 2910 for receiving a selection of final approval of the currently completed payment on the display unit 251, in addition to information for notifying that the payment is completed. The second figure of FIG. 29 shows an example in which the menu screen 2910 for receiving the final approval is displayed in at least a region of the display unit 251, in which the payment detail information 2900 is displayed.

The control unit 180 may sense the user's selection from the menu screen 2910 for receiving a selection of the final approval. In addition, the control unit 180 may cancel the currently completed payment on the basis of the user's selection. When the payment is cancelled, screen information 2920 for notifying the payment cancellation as shown in the third figure of FIG. 29, and information (e.g., information regarding the purchased product) regarding the requested payment in the first figure of FIG. 29 may be included in the payment cancellation details 2020 shown in the third figure of FIG. 20 and then displayed.

As described above, an example in which the completed payment is cancelled depending on the presence of the final approval of the user after the payment is completed has been described. However, it will be appreciated that the control unit 180 may suspend the payment completion before the final approval is selected by the user. That is, it will be appreciated that the control unit 180 may proceed with the payment process and may request the final approval from the user as the last stage for completing the payment. In this case, it may be displayed on the display unit 251 that the payment is completed as shown in the second figure of FIG. 29. However, the payment may be actually completed only upon final approval of the user.

Only when it is determined that there is a high possibility that the user has purchased the product impulsively or by mistake, the control unit 180 may display the menu screen 2910 for receiving a selection of final approval on the display unit 251. In this case, the control unit 180 may determine whether the user has purchased the product impulsively or by mistake on the basis of a predetermined criterion.

For example, the control unit 180 may determine whether the user has purchased the product impulsively on the basis of the action of the user sensed before the payment is requested. That is, the control unit 180 may perform the determination on the basis of a time taken until the payment is requested after the action of the user associated with the product purchase is sensed or whether at least one product is compared before the product is purchased. Here, the action of the user associated with the product purchase may denotes an action of the user visiting a web page in which the product may be purchased or an action of the user staying in a web page in which the product may be purchased after visiting the web page. The web page in which the product may be purchased may be a predetermined web page or a web page of a predetermined website. Alternatively, when a web page accessed by a user includes information (e.g., a payment-related tap) associated with a product purchase as a result of parsing the web page during the user's web browsing, the currently accessed web page may be determined as the web page in which the product may be purchased.

In addition, the control unit 180 may determine that the user has performed at least one comparison before purchasing the product on the basis of whether the user has repeatedly visited a purchase page visited by the user at least one or more times before the payment is requested. When the payment is requested without a revisit of any one of the previously visited purchase pages, the control unit 180 may determine that the payment request is caused by an impulse purchase of the user.

The control unit 180 may determine whether the currently requested payment is caused by the impulse purchase of the user on the basis of a way in which the purchase page corresponding to the requested payment is accessed. For example, when the payment is requested through a web page connected through a predetermined advertisement medium, that is, a banner advertisement or pop up advertisement or a purchase page connected through link information, for example, a text link, the control unit 180 may determine that the payment request is caused by the impulse purchase of the user. In this case, as shown in the second figure of FIG. 29, the control unit 180 may display payment detail information 2900 further including a menu screen 2910 for receiving a selection of final approval from the user on the display unit 251, instead of payment detail information indicating only payment completion details.

In addition, the control unit 180 may determine whether the user has purchased the product by mistake on the basis of the time at which the payment is requested. That is, the control unit 180 may check whether the payment is requested at a busy time, such as an office-going time or an office time, at which the user cannot have enough time to purchase the product. When the payment is requested at the busy time, the control unit 180 may determine that there is a high possibility that the user has requested the payment by mistake and may display the payment detail information 2900 further including the menu screen 2910 for receiving a selection of final approval on the display unit 251.

The payment detail information may include all information regarding product purchase details that may be cancelled by the user in addition to the currently completed payment. FIG. 30 shows an example in which such payment detail information is displayed.

Referring to FIG. 30, the first figure of FIG. 30 shows an example in which payment request for product purchase is selected. When the payment request is sensed, the control unit 180 may suspend proceeding with the requested payment during a predetermined extension period and may complete the payment when the payment is not cancelled during the predetermined extension period or when the user proceeds with the payment process.

When the payment is completed, the control unit 180 may display payment detail information including information regarding cancellable details 3002 and 3004 out of details of products purchased by the user on the display unit 251. Here, the "cancellable product purchase details" may be "purchase details of products of which deliveries have not been started yet" in consideration of characteristics of an online purchase way in which payment for the product purchase is made first and then the purchased product is delivered to an address of the user. The "cancellable product purchase details" has been described as being determined according to whether the delivery is started. However, the present invention is not limited thereto. That is, when there is another predetermined condition associated with the purchase, for example, the user is allowed to cancel a purchase after purchasing the product and before the user confirms the purchase, all products of which purchases are not confirmed may be displayed in the payment detail information 3000 as "cancellable product purchase details."

As shown in the second figure of FIG. 30, when the user selects any one 3002 of the cancellable product purchase details from the payment detail information 3000, the control unit 180 may receive confirmation of whether to cancel the selected purchase detail (see the third figure of FIG. 30). When the user selects cancellation of the purchase detail, the product purchase corresponding to the selected detail 3002 may be cancelled.

When at least one of the cancellable product purchase details is canceled, the payment detail information 3000 from which the cancelled detail 3002 has been excluded may be displayed on the display unit 251, as shown in the fourth figure of FIG. 30. Furthermore, although not shown, when at least one of the cancellable purchase details is cancelled, it will be appreciated that the control unit 180 may display more detailed information regarding the canceled product purchase detail on the display unit 251.

The effects of the mobile terminal and the control method thereof according to the present invention are as follows.

According to at least one of embodiments of the present invention, it is possible to prevent mistakes of the user in advance and allow safe payment to be made by providing an appropriate payment interface on the basis of a result of analyzing the situation of the user when the payment is requested.

According to at least one of embodiments of the present invention, it is also possible to prevent excessive consumption caused by an impulse purchase in advance by determining whether the user makes an impulse purchase on the basis of a result of analyzing an action of the user before the payment and making payment in a corresponding payment way.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a display;
a memory including information regarding a plurality of different payment interfaces; and
a controller configured to:
  cause the display to display screen information regarding purchase and payment of a product, when accessing a purchase page on which the product is available for purchase;
  identify at least one user action associated with a purchase of the product via a network;
  cause the display to display a payment interface of the plurality of different payment interfaces each including different functions, when the payment for the product is requested, wherein which payment interface of the plurality of different payment interfaces is determined according to the identified at least one user action;
  perform payment for the product using the displayed payment interface;
  cause the display to display a third payment interface including purchase history information related to the product, when a user accesses the purchase page in a predetermined manner;
  cause the display to display either a second payment interface that includes a number of times the user accesses the purchase page or a first payment interface including only a function of requesting the payment, when the user does not access the purchase page in the predetermined manner, wherein which of the first payment interface or the second payment interface is displayed is based on whether or not the user accessed the purchase page at least once prior to the payment request;
  cause the display to display a graphic object indicating that a compared product is present on at least a portion of the display when the at least one user action indicates that access of a same purchase page has been performed two or more times before the payment is requested;
  cause the display to display information regarding a number of compared products, wherein the information regarding the number of compared products is a number of purchase pages that do not overlap each other and that have been accessed as indicated by the at least one user action;
  cause the display to display information regarding the purchase pages accessed after the user conducts an action associated with the purchase of the product and before the performing of the payment, wherein, the information regarding the purchase pages further includes link information regarding the purchase pages; and
  access any one of the purchase pages based on the link information, and cause the display to display a screen associated with the accessed purchased page, when any one item of the information regarding the purchase pages is selected by the user.

2. The mobile terminal of claim 1, wherein the first payment interface allows the requesting for payment to be immediately made, the second payment interface includes payment suspension in which the requesting for payment is suspended according to user selection or until a predetermined condition is satisfied, and the third payment interface further provides additional information regarding the product.

3. The mobile terminal of claim 1, wherein the controller is further configured to:
determine an action of the user accessing the purchase page as an action associated with the product purchase when a purchase page for purchasing the product is accessed, wherein
the purchase page is either a web page predetermined as allowing the product purchase, a web page of a web site predetermined as allowing the product purchase, or a web page including information regarding the product purchase.

4. The mobile terminal of claim 1, wherein the predetermined manner is a way in which the purchase page is accessed through an advertisement displayed in a form of a pop-up or banner, or a way in which the purchase page is accessed through a specific character string, or an image in which the link information regarding the purchase page is set.

5. The mobile terminal of claim 2, wherein,
the third payment interface provides further information regarding purchase details of a product identical or similar to the product currently being purchased, and
the information regarding the purchase details includes information regarding at least one of a price, an image, or a purchase time of the same or similar product.

6. The mobile terminal of claim 5, wherein,
the purchase details include information regarding products that have been successfully purchased for a predetermined time, and wherein the controller is further configured to:
determine whether the product identical or similar to the product currently being purchased is present among the products that have been successfully purchased for the predetermined time based on at least one of a kind, a name, a color, a manufacturer, or a brand of the product currently being purchased.

7. The mobile terminal of claim 1, wherein the controller is further configured to:
allow the requested payment to be made through any one of the first payment interface, the second payment interface, or the third payment interface based on whether a screen associated with execution of a specific function, or a screen associated with a specific operation state, is displayed on the display, or whether a predetermined time has elapsed.

8. The mobile terminal of claim 7, wherein the predetermined time is a time previously set to automatically switch the display to an inactive state.

9. The mobile terminal of claim 1, wherein the controller is further configured to:
suspend the performing of the payment for a predetermined time, and proceed with the payment process after the predetermined time expires; and
cancel the performing of the payment, or proceeding with the performing of the payment, based on a user input sensed for the predetermined time.

10. The mobile terminal of claim 9, wherein the controller is further configured to:
cause the display to display a graphic object for indicating an elapse of the predetermined time; and
cancel the performing of the payment based on a touch input received at the displayed graphic object.

11. The mobile terminal of claim 10, wherein the controller is further configured to:
cause the display to display at least one character corresponding to remaining time of the predetermined time.

12. The mobile terminal of claim 9, wherein the controller is further configured to:
cause the display to display payment detail information including a payment cancellation menu for selecting cancellation of a completed payment based on whether a predetermined condition is satisfied; and
allow the request for payment to be approved based on whether a user input is applied to the payment cancellation menu.

13. A purchase method performed at a mobile terminal having a display, the method comprising:
displaying, on the display, screen information regarding purchase and payment of a product, when accessing a purchase page on which the product is available for purchase;
identifying at least one user action associated with a purchase of the product via a network;
displaying, on the display, a payment interface of the plurality of different payment interfaces each including different functions, when the payment for the product is requested, wherein which payment interface of the plurality of different payment interfaces is determined according to the identified at least one user action;
performing payment for the product using the displayed payment interface;
displaying, on the display, a third payment interface including purchase history information related to the product, when a user accesses the purchase page in a predetermined manner;
displaying, on the display, either a second payment interface that includes a number of times the user accesses the purchase page or a first payment interface including only a function of requesting the payment, when the user does not access the purchase page in the predetermined manner, wherein which of the first payment interface or the second payment interface is displayed is based on whether or not the user accessed the purchase page at least once prior to the payment request;
displaying, on the display, a graphic object indicating that a compared product is present on at least a portion of the display when the at least one user action indicates that access of a same purchase page has been performed two or more times before the payment is requested;
displaying, on the display, information regarding a number of compared products, wherein the information regarding the number of compared products is a number of purchase pages that do not overlap each other and that have been accessed as indicated by the at least one user action;
displaying, on the display, information regarding the purchase pages accessed after the user conducts an action associated with the purchase of the product and before the performing of the payment, wherein, the information regarding the purchase pages further includes link information regarding the purchase pages; and
accessing any one of the purchase pages based on the link information, and cause the display to display a screen associated with the accessed purchased page, when any one item of the information regarding the purchase pages is selected by the user.

14. The method of claim 13, wherein the second payment interface further includes payment suspension in which the request for payment is suspended according to user selection or until a predetermined condition is satisfied, and
wherein the payment suspension further comprises:
suspending a process for the payment for a predetermined time; and
proceeding with the performing of the payment when the predetermined time has expired, and wherein
the suspending of the payment process comprises:
sensing a user input for the predetermined time; and
cancelling the performing of the payment or proceeding with the performing of the payment before the predetermined time has expired, based on the sensed user input.

* * * * *